(12) United States Patent
Tzikas et al.

(10) Patent No.: US 6,518,408 B1
(45) Date of Patent: Feb. 11, 2003

(54) REACTIVE COLORANTS, PRODUCTION AND USE THEREOF

(75) Inventors: Athanassios Tzikas, Pratteln (CH); Rolf Deitz, deceased, late of Grenzach-Wyhlen (DE), by Heidi Deitz, legal representative

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/743,694

(22) PCT Filed: Jul. 5, 1999

(86) PCT No.: PCT/EP99/04647

§ 371 (c)(1), (2), (4) Date: Mar. 19, 2001

(87) PCT Pub. No.: WO00/04099

PCT Pub. Date: Jan. 27, 2000

(30) Foreign Application Priority Data

Jul. 13, 1998 (EP) ............................................ 98810659

(51) Int. Cl.[7] ........................ C09B 62/09; C09B 62/475; C09B 62/513; C09B 67/22; D06P 1/38
(52) U.S. Cl. ...................... 534/637; 534/642; 534/643; 8/549
(58) Field of Search ................................ 534/637, 642, 534/643; 8/549

(56) References Cited

U.S. PATENT DOCUMENTS

| | | | |
|---|---|---|---|
| 4,242,258 A | 12/1980 | Noll et al. .................. | 260/152 |
| 5,434,251 A | 7/1995 | Herd ......................... | 534/566 |
| 5,493,010 A | 2/1996 | Herd et al. ................. | 534/642 |

FOREIGN PATENT DOCUMENTS

| | | |
|---|---|---|
| EP | 0568816 | 11/1993 |
| EP | 0617089 | 9/1994 |

*Primary Examiner*—Fiona T. Powers
(74) *Attorney, Agent, or Firm*—Kevin T. Mansfield

(57) ABSTRACT

Compounds of formula (1)

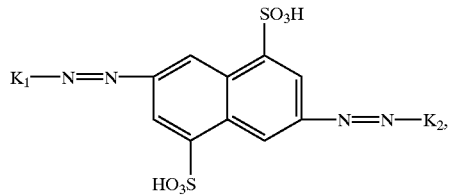

(1)

wherein $K_1$ and $K_2$ are each independently of the other the radical of a coupling component from the series benzene, naphthalene, 4-alkyl-6-hydroxypyridone-(2), 2,5-diamino-4-alkylpyridine, 1-arylpyrazolone-(5) and 1-aryl-5-aminopyrazole, at least one of which contains a fiber-reactive group, with the proviso that (i) the fiber-reactive group is not 2-(β-sulfatoethylsulfonyl)ethylamino when $K_1$ and $K_2$ are phenyl substituted by a fiber-reactive group, and (ii) the fiber-reactive group is not β-sulfatoethylsulfonyl when $K_1$ and $K_2$ are N-(β-sulfatoethyl)aniline substituted on the phenyl ring by a fiber-reactive group, are suitable for dyeing a wide variety of fiber materials, especially cellulosic fiber materials, and yield dyeings having good allround properties.

15 Claims, No Drawings

REACTIVE COLORANTS, PRODUCTION AND USE THEREOF

The present invention relates to novel reactive colorants, to a process for their production and to their use.

The practice of dyeing using reactive dyes has recently led to higher demands being made on the quality of the dyeings and the profitability of the dyeing process. As a result, there is still a need for novel reactive dyes having improved properties, especially in respect of their application.

Dyeing nowadays requires reactive dyes that have sufficient substantivity and at the same have good ease of washing off of unfixed dye. They should also have a good tinctorial yield and high reactivity, the objective being to provide especially dyeings having high degrees of fixing. The known dyes do not satisfy these requirements in all properties.

The problem underlying the present invention is accordingly to find, for the dyeing and printing of fibre materials, novel improved reactive dyes having the qualities characterised above to a high degree. The novel dyes should especially be distinguished by high fixing yields and high fibre-dye binding stability, and it should also be possible for dye that is not fixed to the fibre to be washed off easily. The dyes should also yield dyeings having good allround properties, for example fastness to light and to wetting.

It has been shown that the problem posed is largely solved by the novel reactive dyes defined below.

The present invention accordingly relates to compounds of formula (1)

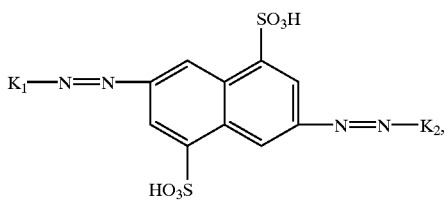

wherein
$K_1$ and $K_2$ are each independently of the other the radical of a coupling component from the series benzene, naphthalene, 4-alkyl-6-hydroxypyridone-(2), 2,5-diamino-4-alkylpyridine, 1-arylpyrazolone-(5) and 1-aryl-5-aminopyrazole, at least one of the radicals $K_1$ and $K_2$ containing a fibre-reactive group,
with the proviso that
(i) the fibre-reactive group is not 2-(β-sulfatoethylsulfonyl)ethylamino when $K_1$ and $K_2$ are phenyl substituted by a fibre-reactive group, and
(ii) the fibre-reactive group is not β-sulfatoethylsulfonyl when $K_1$ and $K_2$ are N-(β-sulfatoethyl)aniline substituted on the phenyl ring by a fibre-reactive group.

The radicals $K_1$ and $K_2$ may contain substituents customary in dyes.

From the series of substituents there may be mentioned by way of example: alkyl groups having from 1 to 12 carbon atoms, especially from 1 to 4 carbon atoms, such as methyl, ethyl, n- or iso-propyl, and n-, iso-, sec- or tert-butyl, alkoxy groups having from 1 to 8 carbon atoms, especially from 1 to 4 carbon atoms, such as methoxy, ethoxy, n- or iso-propoxy, and n-, iso-, sec- or tert-butoxy, $C_1$–$C_4$alkoxy substituted in the alkyl moiety, for example, by hydroxy, $C_1$–$C_4$alkoxy or by sulfato, such as 2-hydroxyethoxy, 3-hydroxy-propoxy, 2-sulfatoethoxy, 2-methoxyethoxy or 2-ethoxyethoxy, alkanoylamino groups having from 2 to 8 carbon atoms, especially $C_2$–$C_4$alkanoylamino groups, such as acetyl-amino or propionylamino, benzoylamino or $C_2$–$C_4$alkoxycarbonylamino groups, such as methoxycarbonylamino or ethoxycarbonylamino, amino, N-mono- or N,N-di-$C_1$–$C_4$-alkylamino unsubstituted or substituted in the alkyl moiety, for example, by hydroxy, sulfo, sulfato or by $C_1$–$C_4$alkoxy, such as methylamino, ethylamino, N,N-dimethyl- or N,N-diethyl-amino, sulfomethylamino, β-hydroxyethylamino, N,N-di(2-hydroxyethylamino), N-β-sulfato-ethylamino, phenylamino unsubstituted or substituted in the phenyl moiety by methyl, methoxy, halogen or by sulfo, N—$C_1$–$C_4$alkyl-N-phenylamino unsubstituted or substituted in the alkyl moiety by hydroxy, sulfo or by sulfato or unsubstituted or substituted in the phenyl moiety by methyl, methoxy, halogen or by sulfo, such as N-methyl-N-phenylamino, N-ethyl-N-phenylamino, N-β-hydroxyethyl-N-phenylamino or N-β-sulfoethyl-N-phenylamino, unsubstituted or sulfo-substituted naphthylamino, alkanoyl groups having from 2 to 8 carbon atoms, especially from 2 to 4 carbon atoms, such as acetyl or propionyl, benzoyl, alkoxy-carbonyl having from 1 to 4 carbon atoms in the alkoxy moiety, such as methoxycarbonyl or ethoxycarbonyl, alkylsulfonyl having from 1 to 4 carbon atoms, such as methylsulfonyl or ethylsulfonyl, phenyl- or naphthyl-sulfonyl, trifluoromethyl, nitro, cyano, hydroxy, halogen, such as fluorine, chlorine or bromine, carbamoyl, N—$C_1$–$C_4$alkylcarbamoyl, such as N-methylcarbamoyl or N-ethylcarbamoyl, sulfamoyl, N—$C_1$–$C_4$alkylsulfamoyl, such as N-methyl-sulfamoyl, N-ethylsulfamoyl, N-propylsulfamoyl, N-isopropylsulfamoyl or N-butylsulfamoyl, N-(β-hydroxyethyl)sulfamoyl, N,N-di(β-hydroxyethyl)sulfamoyl, N-phenylsulfamoyl, ureido, carboxy, sulfomethyl, sulfo or sulfato, and fibre-reactive radicals. The alkyl radicals may additionally be interrupted by oxygen (—O—) or by an amino group (—NH—, —N($C_1$–$C_4$alkyl)-).

The term "sulfo" here generally includes both the free acid —$SO_3H$ and any desired salt form, for example an alkali metal, alkaline earth metal or ammonium salt or the salt of an organic amine. Examples thereof include the sodium, potassium, lithium or ammonium salt or the salt of triethanolamine.

Preferably each of the radicals $K_1$ and $K_2$ in the compounds according to the invention contains at least one fibre-reactive group, and especially one fibre-reactive group. "Fibre-reactive radicals" are to be understood as meaning those that are capable of reacting with the hydroxy groups of cellulose, with the amino, carboxy, hydroxy and thiol groups in wool and silk, or with the amino and, where present, carboxy groups of synthetic polyamides, with the formation of covalent chemical bonds. The fibre-reactive radicals are generally bound to the dye radical directly or by way of a bridge member. Suitable fibre-reactive radicals include, for example, those containing at least one removable substituent on an aliphatic, aromatic or heterocyclic radical or wherein the mentioned radicals contain a radical suitable for reaction with the fibre material, such as, for example, a vinyl radical. A fibre-reactive radical present in $K_1$ or $K_2$ preferably corresponds to formula (2a), (2b), (2c), (2d) or (2e)

—NH—CO—C(Hal)=CH$_2$ (2d) or

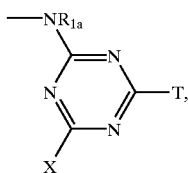 (2e)

wherein

Hal is chlorine or bromine and

X is halogen, 3-carboxypyridin-1-yl or 3-carbamoyl-pyridin-1-yl,

T independently thereof has a meaning given for X or is hydroxy, $C_1$–$C_4$alkoxy, phenoxy, $C_1$–$C_4$alkylthio, morpholino, amino unsubstituted or substituted by non-fibre-reactive radicals, or a fibre-reactive radical of formula (3a), (3b), (3c), (3d), (3e) or (3f)

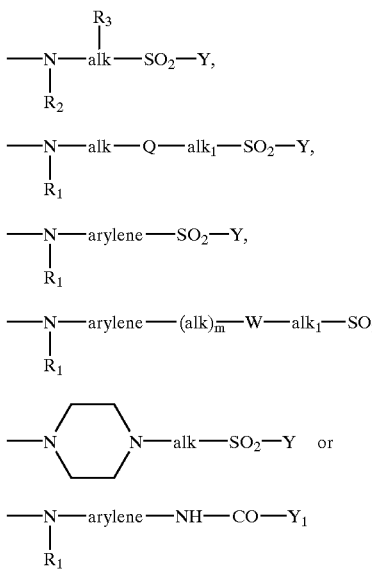

$R_1$ and $R_{1a}$ are each independently of the other hydrogen or $C_1$–$C_4$alkyl, $R_2$ is hydrogen, $C_1$–$C_4$alkyl unsubstituted or substituted by hydroxy, sulfo, sulfato, carboxy or by cyano, or a radical

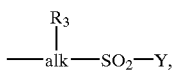

$R_3$ is hydrogen, hydroxy, sulfo, sulfato, carboxy, cyano, halogen, $C_1$–$C_4$alkoxycarbonyl, $C_1$–$C_4$alkanoyloxy, carbamoyl or the group —SO$_2$—Y, alk and alk, are each independently of the other $C_1$–$C_6$alkylene, arylene is a phenylene or naphthylene radical unsubstituted or substituted by sulfo, carboxy, $C_1$–$C_4$alkyl, $C_1$–$C_4$alkoxy or by halogen, $Y_1$ is a group —CH(Hal)—CH$_2$—Hal or —C(Hal)=CH$_2$ and Hal is chlorine or bromine, Q is a radical —O— or —NR$_1$—, wherein R$_1$ is as defined above, W is a group —SO$_2$—NR$_2$—, —CONR$_2$— or —NR$_2$CO—, n is an integer from 1 to 6 and m is 0 or 1 and Y is vinyl or a radical —CH$_2$—CH$_2$—U and U is a group removable under alkaline conditions.

As a leaving group U there come into consideration, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$–C$_4$alkyl or —OSO$_2$—N(C$_1$–C$_4$alkyl)$_2$. U is preferably a group of formula —Cl, —OSO$_3$H, —SSO$_3$H, —OCO—CH$_3$, —OCO—C$_6$H$_5$ or —OPO$_3$H$_2$, especially —Cl or —OSO$_3$H and more especially —OSO$_3$H.

Examples of suitable radicals Y are accordingly vinyl, β-bromo- or β-chloroethyl, β-acetoxy-ethyl, β-benzoyloxyethyl, β-phosphatoethyl, β-sulfatoethyl and β-thiosulfatoethyl. Y is preferably vinyl, β-chloroethyl or β-sulfatoethyl and especially vinyl or β-sulfatoethyl.

$R_1$ and $R_{1a}$ are each independently of the other preferably hydrogen, methyl or ethyl and especially hydrogen.

$R_2$ is preferably hydrogen or $C_1$–$C_4$alkyl, such as methyl, ethyl, propyl, isopropyl, butyl, isobutyl, sec-butyl or tert-butyl and especially hydrogen, methyl or ethyl. $R_2$ is more especially hydrogen.

$R_3$ is preferably hydrogen.

n is preferably the number 2, 3 or 4, especially the number 2 or 3 and more especially the number 2.

When T is amino unsubstituted or substituted by non-fibre-reactive radicals, it may be amino, N—$C_1$–$C_4$alkylamino or N,N-di-$C_1$–$C_4$alkylamino, the alkyl being unsubstituted or substituted, for example, by sulfo, sulfato, hydroxy, carboxy or by phenyl, cyclohexylamino, N—$C_1$–$C_4$alkyl-N-phenylamino or phenylamino or naphthylamino, the phenyl or naphthyl being unsubstituted or substituted, for example, by $C_1$–$C_4$alkyl, $C_1$–$C_4$alkoxy, $C_2$–$C_4$alkanoylamino, carboxy, sulfo or by halogen.

Examples of suitable non-fibre-reactive amino radicals T include amino, methylamino, ethylamino, β-hydroxyethylamino, N,N-di-p-hydroxyethylamino, β-sulfoethylamino, cyclohexylamino, morpholino, o-, m- or p-chlorophenylamino, o-, m- or p-methylphenyl-amino, o-, m- or p-methoxyphenylamino, o-, m- or p-sulfo-phenylamino, disulfophenylamino, o-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxy.

As non-fibre-reactive radical, T is preferably $C_1$–$C_4$alkoxy, $C_1$–$C_4$alkylthio, hydroxy, amino, N—$C_1$–$C_4$alkylamino unsubstituted or substituted in the alkyl moiety by hydroxy, sulfato or by sulfo, morpholino, phenylamino or N—$C_1$–$C_4$alkyl-N-phenylamino wherein the phenyl is in each case unsubstituted or substituted by sulfo, carboxy, acetylamino, methyl or by methoxy.

Especially preferred non-fibre-reactive radicals T are amino, N-methylamino, N-ethylamino, morpholino, phenylamino, 2-, 3- or 4-sulfophenylamino or N—$C_1$–$C_4$alkyl-N-phenylamino.

X is preferably halogen, e.g. fluorine, chlorine or bromine and especially chlorine or fluorine.

Hal is preferably bromine.

alk and alk, are each independently of the other, for example, a methylene, ethylene, 1,3-propylene, 1,4-butylene, 1,5-pentylene or 1,6-hexylene radical or a branched isomer thereof.

alk and alk, are each independently of the other preferably a $C_1$–$C_4$alkylene radical and especially an ethylene radical or a propylene radical.

arylene is preferably an unsubtituted or, for example, sulfo-, methyl-, methoxy- or carboxy-substituted 1,3- or 1,4-phenylene radical and especially an unsubstituted 1,3- or 1,4-phenylene radical.

Q is preferably —NH— or —Q— and especially —O—.

W is preferably a group of formula —CONH— or —NHCO—, especially a group of formula —CONH—.

m is preferably 0.

Preferred as reactive radicals of formulae (3a) to (3f) are those wherein W is a group of formula —CONH—, $R_1$, $R_2$ and $R_3$ are in each case hydrogen, Q is the radical —O— or —NH—, alk and alk, are each independently of the other ethylene or propylene, arylene is unsubstituted or methyl-, methoxy-, carboxy- or sulfo-substituted phenylene, Y is vinyl or β-sulfatoethyl, $Y_1$ is —CHBr—$CH_2$Br or —CBr=$CH_2$ and m is 0.

A reactive radical present in $K_1$ or $K_2$ is preferably a radical of the formula (2a), (2b), (2c), (2d) or (2e) given above wherein Hal is bromine, $R_2$ is hydrogen, n is the number 2 or 3, X is halogen, T is $C_1$-$C_4$alkoxy, $C_1$-$C_4$alkylthio, hydroxy, amino, N—$C_1$-$C_4$alkylamino unsubstituted or substituted in the alkyl moiety by hydroxy, sulfato or by sulfo, morpholino, phenylamino or N—$C_1$-$C_4$alkyl-N-phenylamino wherein the alkyl is unsubstituted or substituted by hydroxy, sulfo or by sulfato and the phenyl is in each case unsubstituted or substituted by sulfo, carboxy, acetylamino, methyl or by methoxy, or a fibre-reactive radical of formula (3c') or (3d')

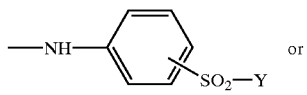
(3c')

or

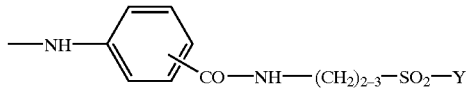
(3d')

and Y is vinyl or β-sulfatoethyl.

Especially preferably the radicals $K_1$ and $K_2$ each independently of the other contain a radical of formula (2a), (2b), (2c) or (2d) given above, preferably (2a) or (2b) and especially (2a), wherein $R_2$, Y and n each have the definitions and preferred meanings given above. $K_1$ and $K_2$ are each independently of the other, for example, a radical of formula

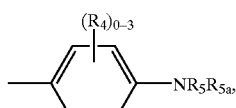
(4a)

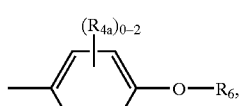
(4b)

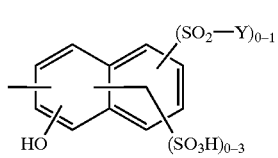
(4c)

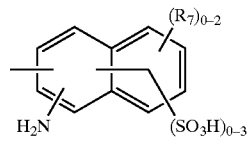
(4d)

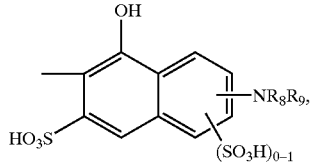
(4e)

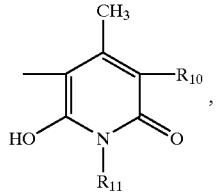
(4f)

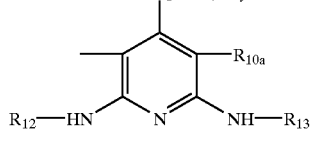
(4g)

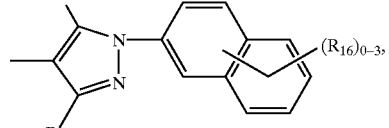
(4h)

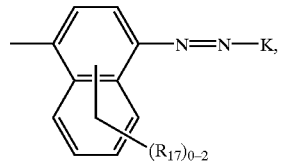
(4i)

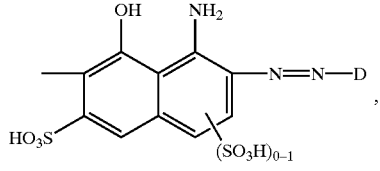
(4j)

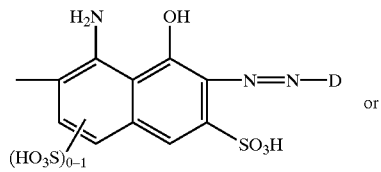
(4k)

or

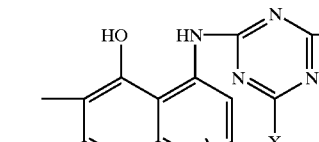
(4l)

wherein $(R_4)_{0-3}$ denotes from 0 to 3 identical or different radicals selected from the group $C_1$–$C_4$alkyl, $C_1$–$C_4$alkoxy, $C_1$–$C_4$alkoxy substituted in the alkyl moiety by hydroxy, $C_1$–$C_4$alkoxy or by sulfato, halogen, carboxy, hydroxy, amino, N-mono- or N,N-di-$C_1$–$C_2$alkylamino, $C_2$–$C_4$-alkanoylamino, ureido, sulfo, $C_1$–$C_4$alkylsulfonyloxy, $C_1$–$C_4$alkylsulfonylamino and a reactive radical of formula (2e) given above;

$(R_{4a})_{0-2}$ denotes from 0 to 2 identical or different radicals selected from the group $C_1$–$C_4$-alkyl, $C_1$–$C_4$alkoxy, phenoxy, halogen, sulfo and hydroxy;

$R_5$ is hydrogen or $C_1$–$C_4$alkyl;

$R_{5a}$ independently thereof has a meaning given for $R_5$ or is $C_2$–$C_4$alkanoyl, $C_1$–$C_4$hydroxy-alkyl, $C_1$–$C_4$sulfatoalkyl, $C_1$–$C_4$alkoxyalkyl or unsubstituted or methyl-, methoxy-, chloro- or sulfo-substituted phenyl;

$R_6$ is hydrogen, $C_1$–$C_4$alkyl or phenyl;

$(R_7)_{0-2}$ denotes from 0 to 2 identical or different substituents selected from the group hydroxy and the fibre-reactive radical of formula (2a) given above;

$R_8$ is hydrogen or $C_1$–$C_4$alkyl unsubstituted or substituted by hydroxy, $C_1$–$C_4$alkoxy, sulfato, sulfo, halogen or by cyano;

$R_9$ independently thereof has a meaning given for $R_8$ or is $C_2$–$C_4$alkanoyl or benzoyl, or wherein —$NR_8R_9$ is a fibre-reactive radical of formula (2e) given above;

$R_{10}$ and $R_{10a}$ are each independently of the other carbamoyl, sulfomethyl or cyano;

$R_{11}$ is hydrogen or $C_1$–$C_4$alkyl unsubstituted or substituted by a radical of formula (2e) given above;

$R_{12}$ and $R_{13}$ are each independently of the other hydrogen or $C_1$–$C_{12}$alkyl unsubstituted or substituted by hydroxy, $C_1$–$C_4$alkoxy, phenoxy, sulfato, sulfo, carboxy, amino or by N-mono-or N,N-di-$C_1$–$C_4$-alkylamino (the alkyl moiety or moieties of which may itself or themselves be substituted by hydroxy, $C_1$–$C_4$alkoxy, phenoxy, sulfato, sulfo, carboxy or by a fibre-reactive radical of formula (2e) given above) and/or uninterrupted or, with the exception of methyl, interrupted by —O—;

$R_{14}$ is methyl or carboxy;

$R_{15}$ is hydroxy or amino;

$(R_{16})_{0-3}$ denotes from 0 to 3 identical or different radicals selected from the group sulfo, halogen, hydroxy, $C_1$–$C_4$alkoxy and $C_1$–$C_4$alkyl;

$(R_{17})_{0-2}$ denotes from 0 to 2 identical or different radicals selected from the group $C_1$–$C_4$-alkyl, $C_1$–$C_4$alkoxy, $C_1$–$C_4$alkoxy substituted in the alkyl moiety by hydroxy, $C_1$–$C_4$alkoxy or by sulfato, $C_2$–$C_4$alkanoylamino, ureido, halogen and sulfo;

K is a radical of formula (4a), (4b), (4c), (4d), (4e), (4f), (4g) or (4h) or (4j), (4k) or (4l) given above and is preferably a radical of formula (4e);

D is a phenyl or 1- or 2-naphthyl radical containing from 1 to 3 identical or different radicals from the group sulfo, $C_1$–$C_4$alkyl, $C_1$–$C_4$alkoxy, halogen and a fibre-reactive radical of formula (2a), (2b), (2c) or (2d);

$D_a$ is the radical of a monoazo or disazo chromophore; and each of X and Y has the meanings given above.

The following preferred meanings apply for the variables given in formulae (4a) to (4l):

$(R_4)_{0-3}$ preferably denotes from 0 to 3 identical or different radicals selected from the group methyl, methoxy, ethoxy substituted in the alkyl moiety by hydroxy, methoxy, ethoxy or by sulfato, chlorine, hydroxy, amino, N-mono- or N,N-di-$C_1$–$C_2$alkylamino, acetylamino, propionylamino, sulfo, and a reactive radical of formula (2e) given above, wherein X is halogen, $R_{1a}$ is hydrogen and T is amino or morpholino unsubstituted or substituted by non-fibre-reactive radicals;

$(R_{4a})_{0-2}$ preferably denotes from 0 to 2 identical or different radicals selected from the group methyl, methoxy, phenoxy, chlorine, sulfo and hydroxy;

$R_5$ is hydrogen, methyl or ethyl;

$R_{5a}$ independently thereof has a meaning given for $R_5$ or is acetyl, propionyl, 2-hydroxyethyl or 2-sulfatoethyl;

$R_6$ is preferably hydrogen;

$R_8$ is preferably hydrogen and $R_9$ is preferably acetyl, propionyl or benzoyl, or —$NR_8R_9$ is a fibre-reactive radical of formula (2e) given above;

$R_{10}$ is preferably carbamoyl or sulfomethyl;

$R_{10a}$ is preferably cyano or carbamoyl;

$R_{11}$ is preferably methyl or ethyl;

$R_{12}$ is preferably hydrogen or $C_1$–$C_6$alkyl unsubstituted or substituted by hydroxy, methoxy, ethoxy, sulfato or by sulfo;

$R_{13}$ independently thereof preferably has a meaning given for $R_{12}$ or is a radical of formula (2e) given above;

$R_{12}$ and $R_{13}$ are each independently of the other especially hydrogen or $C_1$–$C_6$-alkyl unsubstituted or substituted by hydroxy, sulfo or by sulfato;

$R_{15}$ is preferably hydroxy;

$(R_{16})_{0-3}$ preferably denotes from 0 to 3 identical or different radicals selected from the group sulfo, methyl, methoxy, hydroxy and chlorine;

$(R_{17})_{0-2}$ preferably denotes from 0 to 2 identical or different radicals selected from the group methyl, methoxy, $C_1$–$C_2$alkoxy substituted in the alkyl moiety by hydroxy or by sulfato, acetylamino, propionylamino and sulfo;

D is preferably a phenyl or 1- or 2-naphthyl radical containing from 1 to 3 identical or different radicals from the group sulfo, methyl, methoxy, chlorine and a fibre-reactive radical of formula (2a), (2b), (2c) or (2d); and $D_a$ is preferably the radical of a monoazo or disazo chromophore having diazo components and coupling components from the benzene or naphthalene series that are substituted by one or more substituents from the group sulfo, methyl, methoxy, chlorine, amino, hydroxy, acetylamino, propionylamino, benzoylamino, ureido, 2-hydroxyethoxy, 2-sulfatoethoxy and a fibre-reactive radical of formula (2e). $D_a$ in formula (4l) is especially a radical of formula (5a) or (5b)

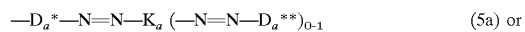  (5a) or

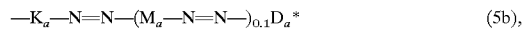  (5b), wherein $D_a^*$ is an unsubstituted or sulfo-substituted phenylene radical, $D_a^{**}$ is phenyl or naphthyl unsubstituted or substituted by sulfo or by a radical of formula (2a) given above, $K_a$ is the radical of a coupling component from the aminonaphtholsulfonic acid series, e.g. the radical of H, K, I or γ acid unsubstituted or substituted on the amino group by acetyl, propionyl, benzoyl or by a fibre-reactive radical of formula (2e) given above, and $M_a$ is phenylene unsubstituted or substituted by sulfo, methyl, methoxy, acetylamino, ureido, 2-hydroxyethoxy or by 2-sulfatoethoxy.

$K_1$ and $K_2$ are each independently of the other preferably a radical of formula (4c'), (4c''), (4d'), (4e'), (4f'), (4g'), (4h'), (4i'), (4j') or (4k')

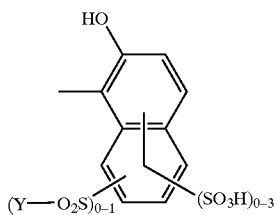
(4c')

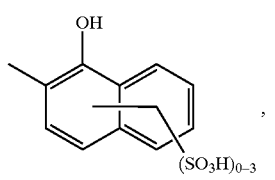
(4c'')

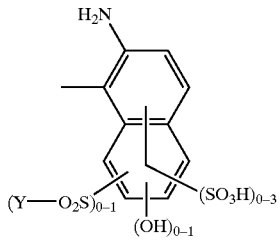
(4d')

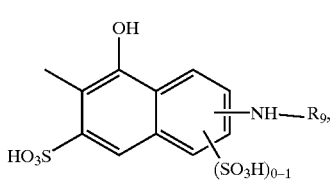
(4e')

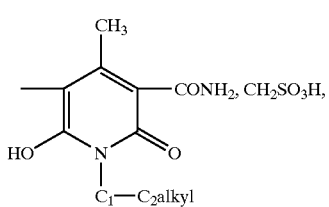
(4f')

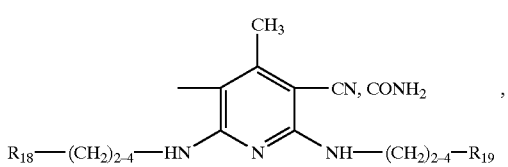
(4g')

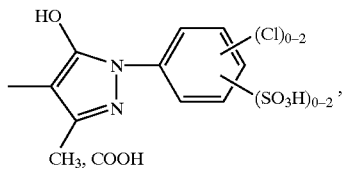
(4h')

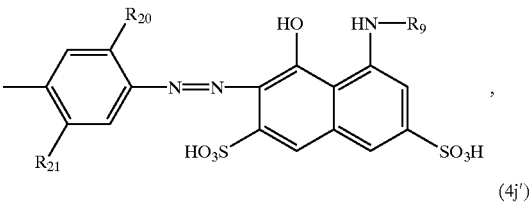
(4i')

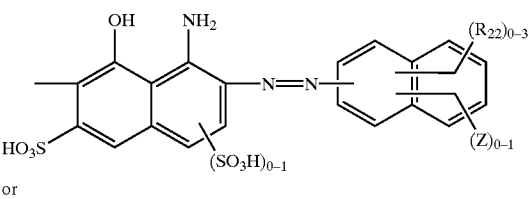
(4j')

or

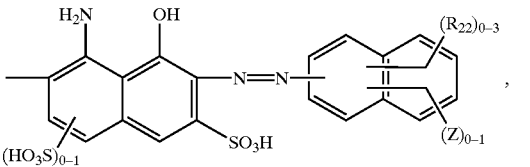
(4k')

wherein $R_9$ is acetyl, benzoyl or a radical of formula (2e')

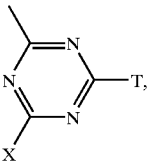
(2e')

wherein the definitions and preferred meanings given above for each of X and T apply, $R_{18}$ is hydrogen, hydroxy or sulfato, $R_{19}$ independently thereof has a meaning given for $R_{18}$ or is a radical of formula (2e), $R_{20}$ and $R_{21}$ are each independently of the other hydrogen, methyl, methoxy, 2-hydroxy-ethoxy, 2-sulfatoethoxy, acetylamino, propionylamino, ureido or sulfo, $(R_{22})_{0-3}$ denotes from 0 to 3 identical or different radicals selected from the group sulfo, chlorine, $C_1$–$C_4$alkyl and $C_1$–$C_4$alkoxy, $(Z)_{0-1}$, where present, denotes a radical of formula (2a), (2b), (2c) or (2d) and the definitions and preferred meanings given above for Y apply.

The radicals $K_1$ and $K_2$ are each independently of the other especially a radical of formula (4e'), (4j') or (4k') given above and more especially of formula (4j') or (4k').

The radicals $K_1$ and $K_2$ may be different or, preferably, identical.

In a preferred embodiment of the present invention, the compounds of formula (1) are compounds of formula (1a)

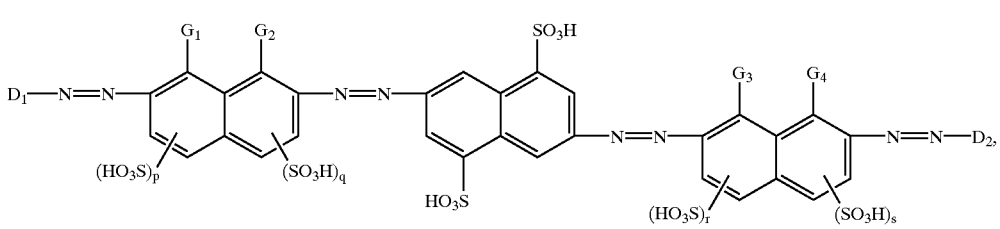
(1a)

wherein
D₁ is a radical of formula (6a)

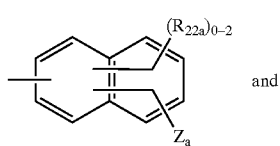
(6a)

and

D₂ is a radical of formula (6b)

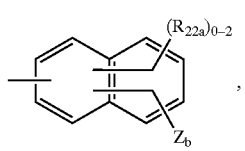
(6b)

$(R_{22a})_{0-2}$ and $(R_{22b})_{0-2}$ each independently of the other denote from 0 to 2 identical or different substituents selected from the group sulfo, chlorine, $C_1$–$C_4$alkyl and $C_1$–$C_4$alkoxy, of the radicals $G_1$ and $G_2$ one is hydroxy and the other is amino, of the radicals $G_3$ and $G_4$ one is hydroxy and the other is amino, p, q, r and s are each independently of the others 0 or 1, the sum of p and q being the number 1 or 2, especially 2, the sum of r and s being the number 1 or 2, especially 2, and $Z_a$ and $Z_b$ are each independently of the other a radical of formula (2a), (2b), (2c) or (2d) given above.

In a special embodiment of the present invention, the radicals $D_1$ and $D_2$ in the compounds of formula (1a) according to the invention have identical meanings.

In an especially preferred embodiment of the present invention, the compounds of formula (1a) are compounds of formula (1b) or (1c)

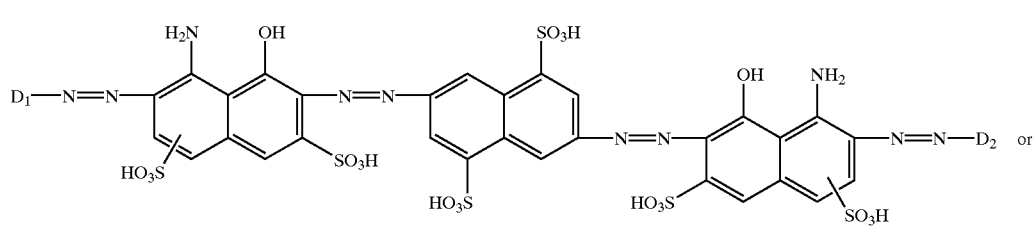
(1b)

or

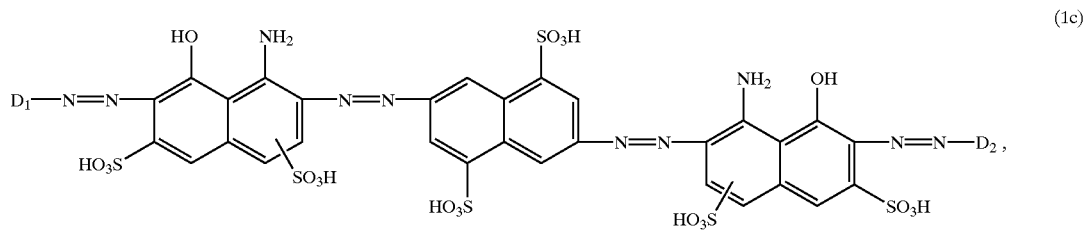
(1c)

wherein
D₁ and D₂ are each independently of the other a radical of formula (6c), (6d), (6e) or (6f)

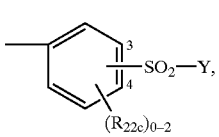
(6c)

-continued

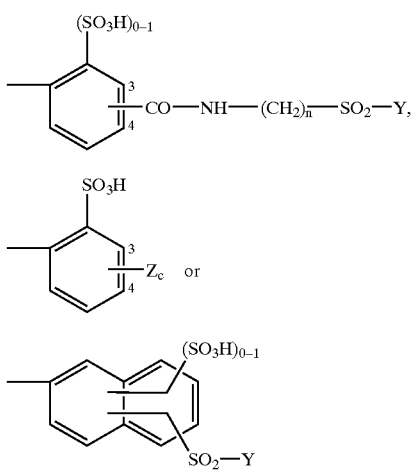

wherein $(R_{22c})_{0-2}$ denotes from 0 to 2 identical or different substituents selected from the group sulfo, methyl and methoxy, $Z_c$ is α,β-dibromopropionylamino or α-bromoacryloylamino, n is the number 2, 3 or 4 and Y is vinyl, β-chloroethyl or β-sulfatoethyl, especially vinyl or β-sulfatoethyl.

Preference is given to compounds of formula (1b) or (1c), wherein $D_1$ and $D_2$ are radicals of formula (6c) wherein $(R_{22c})_{0-2}$ denotes from 0 to 2 identical or different substituents selected from the group methyl and methoxy, and Y is vinyl or β-sulfatoethyl.

The present invention relates also to a process for the preparation of compounds of formula (1), wherein approximately 1 molar equivalent of the compound of formula

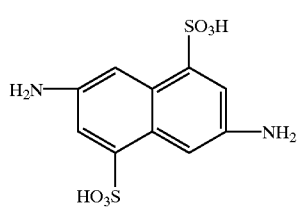

(7)

is tetraazotised in customary manner with a nitrite, e.g. sodium nitrite, in an acid medium, e.g. hydrochloric acid, and the tetraazotised compound is coupled with approximately 1 molar equivalent of a coupling component of formula $K_1$—H (8) and with approximately 1 molar equivalent of a coupling component of formula $K_2$—H (9)

in an acid, neutral or alkaline medium, wherein the definitions and preferred meanings given above for each of $K_1$ and $K_2$ apply.

When $K_1$—H and $K_2$—H are identical coupling components, it is advantageous to react approximately 1 molar equivalent of the tetraazotised compound of formula (7) with approximately 2 molar equivalents of a compound of formula (8).

The synthesis of the compounds of formula (1) can also be carried out by first coupling the tetraazotised compound of formula (7) with a precursor of $K_1$—H or $K_2$—H and then converting the resulting disazo compound into the final compound, for example by coupling with a further diazotised diazo component.

The preferred compounds of formula (1b) can advantageously be prepared, for example, according to process variant "A", by:

(i) coupling approximately 1 molar equivalent of a diazotised compound of formula (10a)

$D_1$—$NH_2$ (10a), wherein $D_1$ is as defined above, with approximately 1 molar equivalent of a coupling component of formula (11)

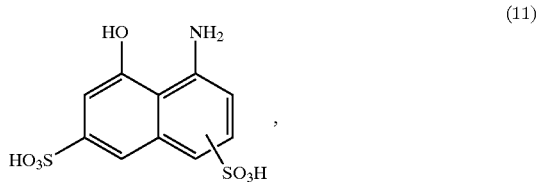

(ii) independently thereof coupling approximately 1 molar equivalent of a diazotised compound of formula (10b)

$D_2$—$NH_2$ (10b), wherein $D_2$ is as defined above, with approximately 1 molar equivalent of a coupling component of formula (11), and (iii) coupling approximately 1 molar equivalent of each of the monoazo compounds obtained according to (i) and (ii) with approximately 1 molar equivalent of a tetraazotised compound of formula (7).

When $D_1$—$NH_2$ and $D_2$—$NH_2$ in process variant "A" are identical compounds, it is advantageous to react approximately 2 molar equivalents of a diazotised compound of formula (10a) with approximately 2 molar equivalents of a compound of formula (11) and then to couple the resulting monoazo compound with approximately 1 molar equivalent of a tetraazotised compound of formula (7).

When $D_1$—$NH_2$ and $D_2$—$NH_2$ in process variant "A" are not identical compounds, process steps (i) and (ii) can be combined by diazotising approximately 2 molar equivalents of a mixture of amines $D_1$—$NH_2$ and $D_2$—$NH_2$, e.g. a 1:1 molar mixture, and coupling with approximately 2 molar equivalents of a coupling component of formula (11) and then proceeding further according to (iii).

The preferred compounds of formula (1 c) can advantageously be prepared, for example, according to process variant "B", by:

(i) coupling approximately 0.5 molar equivalent of a previously tetraazotised compound of formula (7) with approximately 1 molar equivalent of a compound of formula (11) given above, and then (ii) coupling the resulting disazo compound with approximately 1 molar equivalent of a diazotised compound of formula (10a) given above when $D_1$—$NH_2$ and $D_2$—$NH_2$ are identical compounds, or with, for example, a 1:1 molar mixture of approximately 1 molar equivalent of the diazotised compounds of formulae (10a) and (10b) when $D_1$—$NH_2$ and $D_2$—$NH_2$ are not identical compounds.

In the process variants "A" and "B" described above, the first coupling (A(i) and A(ii) or B(i)) takes place in an acid medium and the second coupling (A(iii) and B(ii)) takes place at a higher pH value in a weakly acid, neutral or weakly alkaline medium.

When $D_1$—$NH_2$ and $D_2$—$NH_2$ in the process variants "A" and "B" described above are not identical compounds, mixtures are obtained that also comprise, in addition to the compounds of formulae (1b) and (1c), which are asymmetric with respect to the radicals $D_1$ and $D_2$, the corresponding symmetric compounds of formulae mulae (1c*) and (1c**), especially one compound of each of formulae (1c), (1c*) and (1c**).

The ratio of dyes of formulae (1b), (1b*) and (1b**) or (1c), (1c*) and (1c**) in the mixture in question can vary within wide ranges and will depend upon the ratio of amines $D_1$—$NH_2$ and $D_2$—$NH_2$ used according to A(i) and A(ii) or B(ii).

The above dye mixtures contain, for example, from 5 to 95% by weight, especially from 10 to 90% by weight, and preferably from 20 to 80% by weight, of a dye of formula (1b*) or (1c), based on the total amount of the dyes of formulae (1b*), (1b*) and (1b**) or (1c), (1c*) and (1c**) in the mixture in question.

If, in the above processes for the preparation of compounds of formulae (1b) and (1c), there is used, instead of a molar equivalent of a compound of formula (11), 1 molar equivalent of a mixture of two different compounds of

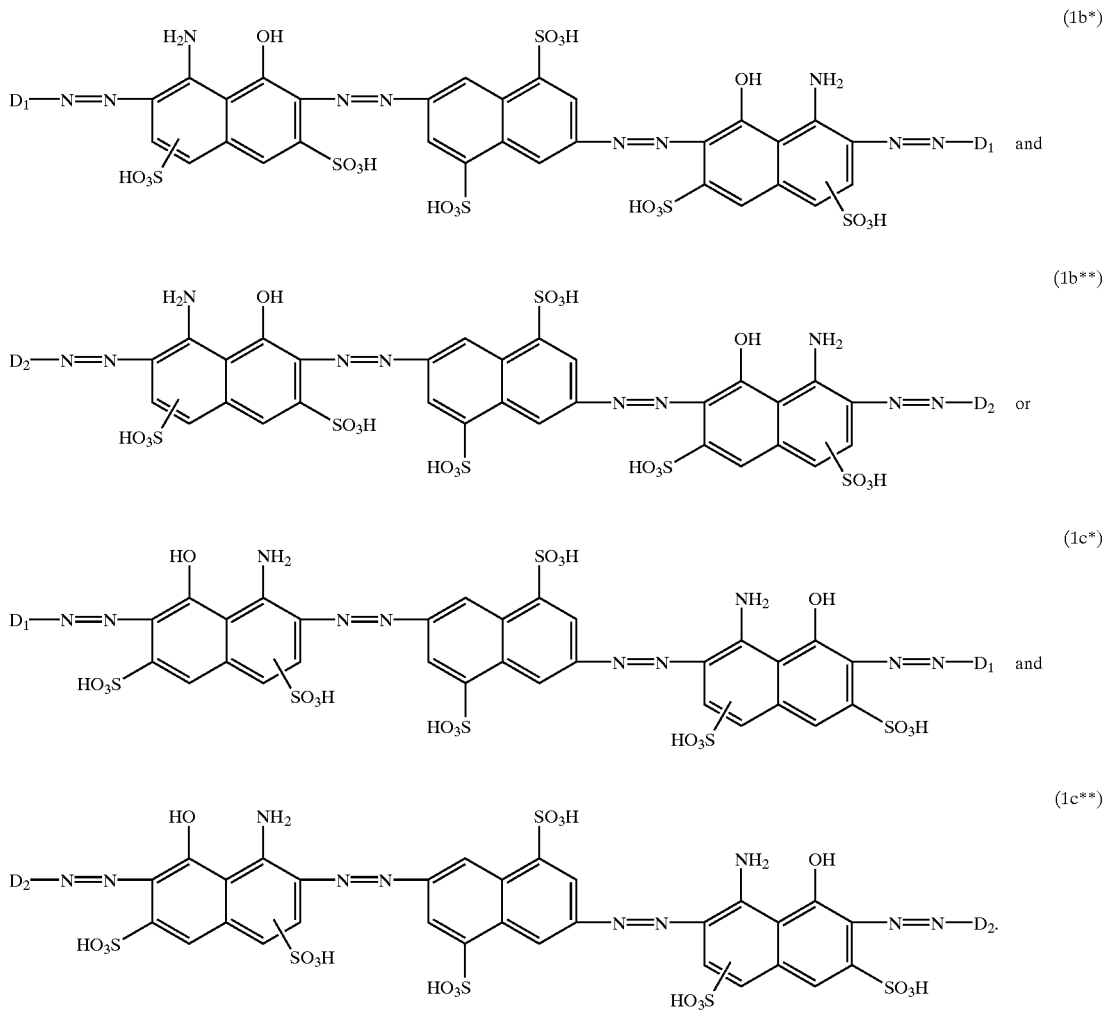

In formulae (1b*), (1b**), (1c*) and (1c**), the definitions and preferred meanings given above for $D_1$ and $D_2$ apply. The present invention accordingly relates also to dye mixtures comprising a compound of formula (1b*) together with at least one compound of formulae (1b*) and (1b**), especially one compound of each of formulae (1b*), (1b*) and (1b**), and to dye mixtures comprising a compound of formula (1c) together with at least one compound of for-formula (11), e.g. approximately 0.5 molar equivalent of an aminonaphtholdisulfonic acid $KK_1$ and approximately 0.5 molar equivalent of an aminonaphtholdisulfonic acid $KK_2$, there are then obtained mixtures of compounds that are symmetric and asymmetric with respect to the aminonaphtholdisulfonic acids $KK_1$ and $KK_2$.

The present invention accordingly relates also to dye mixtures comprising at least one compound of formulae (12a) and (12b)

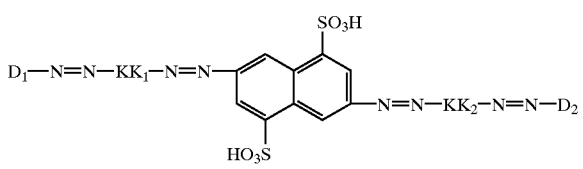

(12a)

and

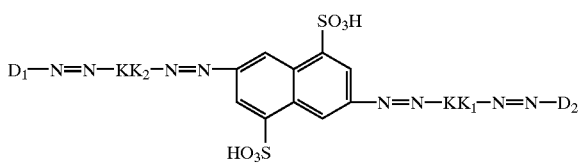

(12b)

together with at least one compound of formulae (12c) and (12d)

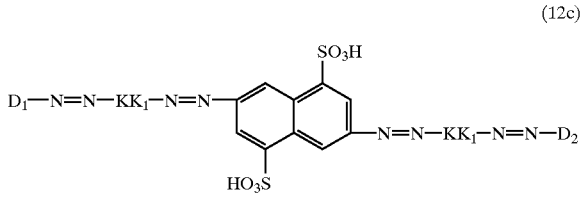

(12c)

and

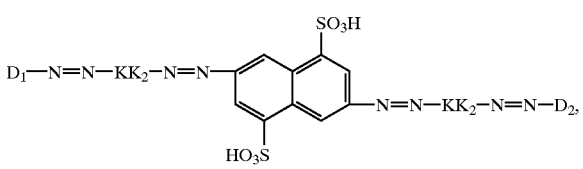

(12d)

especially one compound of each of formulae (12a), (12b), (12c) and (12d), wherein the definitions and preferred meanings given above for the radicals $D_1$ and $D_2$ apply, and $KK_1$ is preferably 1-amino-8-hydroxynaphthalene-3,6-disulfonic acid (H acid) and $KK_2$ is preferably 1-amino-8-hydroxynaphthalene-4,6-disulfonic acid (K acid).

The ratio of dyes of formulae (12a), (12b), (12c) and (12d) in the mixtures can vary within wide ranges and will depend upon the ratio of aminonaphtholdisulfonic acids $KK_1$ and $KK_2$ used according to A(i) and A(ii) or B(i).

The above dye mixtures contain, for example, from 5 to 95% by weight, especially from 10 to 90% by weight, and preferably from 20 to 80% by weight of dyes of formulae (12a) and (12b), based on the total amount of the dyes of formulae (12a), (12b), (12c) and (12d).

The compounds of formulae (7), (8), (9), (10a), (10b) and (11) are known or can be obtained in a manner known per se.

The reactive dyes according to the invention and the mixtures of reactive dyes according to the invention are fibre-reactive, that is to say they are capable of reacting with the hydroxyl groups of cellulose or with the reactive centres of natural and synthetic polyamides, with the formation of covalent chemical bonds.

The reactive dyes and mixtures of reactive dyes according to the invention are suitable for dyeing and printing a wide variety of materials, especially hydroxyl-group-containing or nitrogen-containing fibre materials. Examples include silk, leather, wool, polyamide fibres and polyurethanes, and especially all types of cellulosic fibre materials. Such fibre materials are, for example, natural cellulose fibre, such as cotton, linen and hemp, and cellulose and regenerated cellulose. The reactive dyes according to the invention and the mixtures of reactive dyes according to the invention are also suitable for dyeing or printing hydroxyl-group-containing fibres contained in blend fabrics, for example blends of cotton and polyester fibres or polyamide fibres.

The reactive dyes and mixtures of reactive dyes according to the invention can be applied to the fibre material and fixed to the fibre in a number of ways, especially in the form of aqueous dye solutions or dye print pastes. They are suitable for the exhaust process and also for dyeing using the pad-dyeing process, can be used at low dyeing temperatures and require only short steaming times in the pad-steam process. The degrees of fixing are high and unfixed dye can be washed off readily, the difference between the degree of exhaust and the degree of fixing being remarkably small, that is to say the soaping loss is very small. The dyes and dye mixtures according to the invention are also suitable for printing, especially on cotton, but also for printing nitrogen-containing fibres, for example wool or silk or blend fabrics containing wool.

The dyeings and prints produced on cellulose fibre materials using the dyes and dye mixtures according to the invention have a high tinctorial strength and a high fibre-dye binding stability in both acidic and alkaline ranges, and they also have good fastness to light and very good wet-fastness properties, such as fastness to washing, water, seawater, crossdyeing and to perspiration, as well as good fastness to pleating, to pressing, to rubbing, and especially to chlorine.

The following Examples serve to illustrate the invention. The temperatures are given in degrees Celsius, parts are parts by weight, and the percentages relate to percent by weight, unless otherwise indicated. Parts by weight relate to parts by volume in a ratio of kilograms to litres.

Preparation of the Diazotised Amines of Formulae (10a) and (10b)

EXAMPLE 1

28 parts of an amine of formula $D_{10}$—$NH_2$, wherein $D_{10}$ is a radical of formula

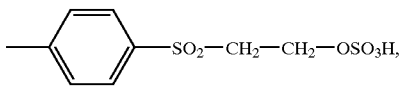

are added to 150 parts of water and stirred thoroughly, 16 parts of concentrated hydrochloric acid are added to the resulting suspension, the mixture is cooled to from 0 to 5° C., and 7 parts of sodium nitrite dissolved in 25 parts of water are slowly added dropwise. When the conversion of the amine to the corresponding diazo compound is complete, the excess of nitrite is destroyed by the addition of sulfamic acid.

EXAMPLES 2 to 12

The diazo compounds of the amines given in Table 1 can be prepared alogously to the procedure described in Example 1 by using, instead of 28 parts of the amine of formula $D_{10}$—$NH_2$, an equimolar amount of the amines $D_{xy}$—$NH_2$ given in Table 1.

TABLE 1

| Ex. | Amine $D_{xy}$-$NH_2$ | $D_{xy}$ |
|---|---|---|
| 2 | $D_{11}$-$NH_2$ | $D_{11}$ = 3-methylphenyl–$SO_2$–$CH_2$–$CH_2$–$OSO_3H$ |
| 3 | $D_{12}$-$NH_2$ | $D_{12}$ = 2-methyl-5-(–$SO_2$–$CH_2$–$CH_2$–$OSO_3H$)phenyl with $HO_3S$ at position 3 |
| 4 | $D_{13}$-$NH_2$ | $D_{13}$ = 2-methyl-5-(–NH–CO–CHBr–$CH_2$Br)phenyl with $HO_3S$ at position 3 |
| 5 | $D_{14}$-$NH_2$ | $D_{14}$ = 3-methyl-4-$SO_3H$-phenyl-NH–CO–CHBr–$CH_2$Br |
| 6 | $D_{15}$-$NH_2$ | $D_{15}$ = 4-methylphenyl–CONH–$(CH_2)_2$–$SO_2$–$(CH_2)_2$–Cl |
| 7 | $D_{16}$-$NH_2$ | $D_{16}$ = 2-methyl-5-(–CONH–$(CH_2)_2$–$SO_2$–$(CH_2)_2$–Cl)phenyl with $HO_3S$ |
| 8 | $D_{17}$-$NH_2$ | $D_{17}$ = 4-methylphenyl–CONH–$(CH_2)_2$–$SO_2$–$(CH_2)_2$–$OSO_3H$ |
| 9 | $D_{18}$-$NH_2$ | $D_{18}$ = 3-methylphenyl–CONH–$(CH_2)_2$–$SO_2$–$(CH_2)_2$–$OSO_3H$ |
| 10 | $D_{19}$-$NH_2$ | $D_{19}$ = 4-$OCH_3$-3-methylphenyl–$SO_2$–$CH_2$–$CH_2$–$OSO_3H$ |

TABLE 1-continued

| Ex. | Amine $D_{xy}-NH_2$ | $D_{xy}$ |
|---|---|---|
| 11 | $D_{20}-NH_2$ | $D_{20}$ = 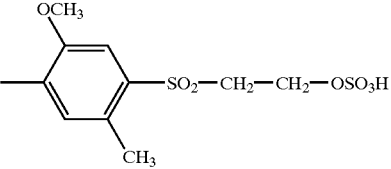 |
| 12 | $D_{21}-NH_2$ | $D_{21}$ = 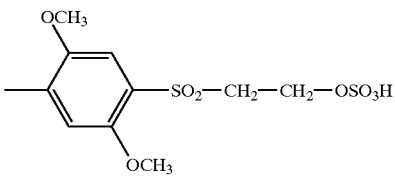 |

Preparation of the Tetraazotised Compound of Formula (7)

EXAMPLE 13

16 parts of the diamine of formula

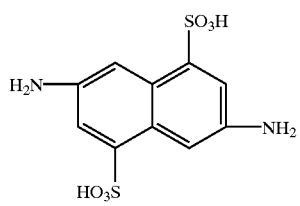

are dissolved in 160 parts of water until neutral. After the solution has cooled to approximately 0° C., 13 parts of concentrated hydrochloric acid are added. A solution of 5.4 parts of sodium nitrite in 20 parts of water is then slowly added dropwise. When the conversion of the diamine to the corresponding tetraazo compound is complete, the excess of nitrite is destroyed by the addition of sulfamic acid.

Preparation of Compounds of Formula (1b)

EXAMPLE 14/15

The solution, obtained according to Example 1, of the diazo compound of the amine of formula $D_{10}$—$NH_2$ is added dropwise, at from 0 to 5° C., to a suspension of 32 parts of 1-amino-8-hydroxynaphthalene-3,6-disulfonic acid (H acid) or 32 parts of 1-amino-8-hydroxynaphthalene-4,6-disulfonic acid (K acid) in 100 parts of water. The mixture is then allowed to warm up to room temperature and is stirred until coupling is complete. The reaction mixture is then cooled to from 5 to 10° C., the pH value is raised to approximately 4.5 with sodium hydrogen carbonate and the solution of tetraazo compound obtained according to Example 13 is slowly added dropwise, the pH value being maintained at approximately 6.5 during the dropwise addition by the addition of sodium hydrogen carbonate. When coupling is complete, the dye solution is freed of salt by dialysis and concentrated by evaporation in vacuo to obtain the compound that in the form of the free acid corresponds to formula

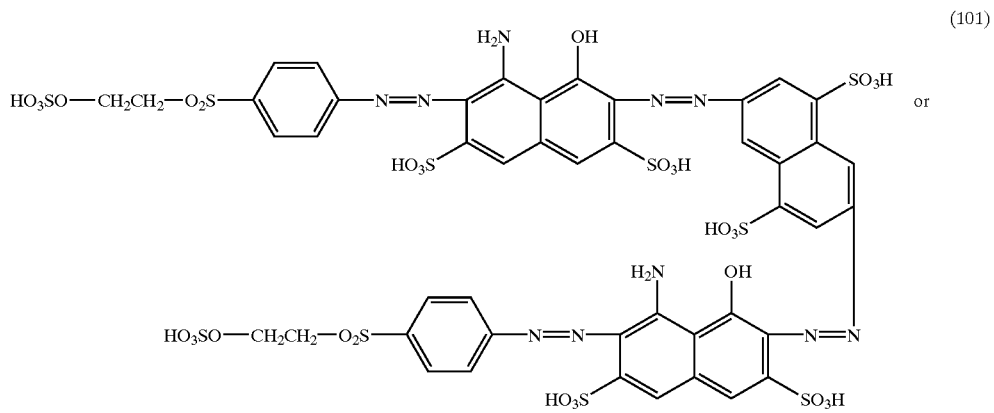

(101)

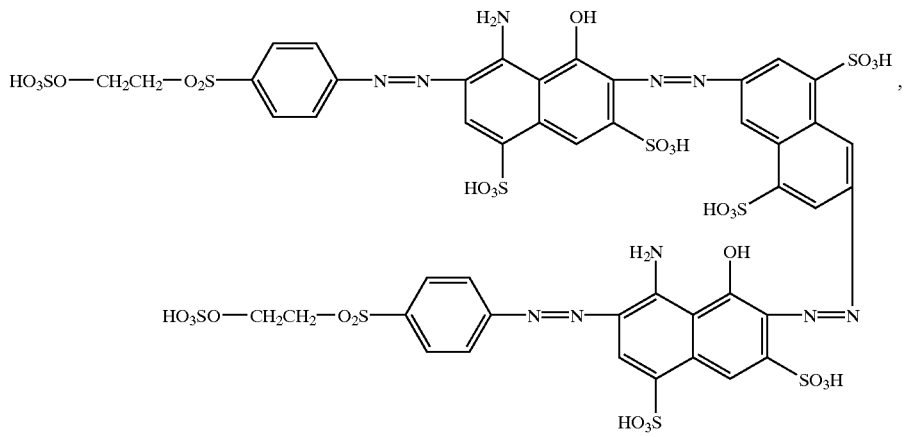

(102)

in the form of a dark powder that dyes cellulose a green shade having good allround properties.

EXAMPLES 16 to 37

Analogously to the procedure described in Example 14 or 15, there can be prepared from the diazo compounds described in Examples 2 to 12 the dyes of the following general formula

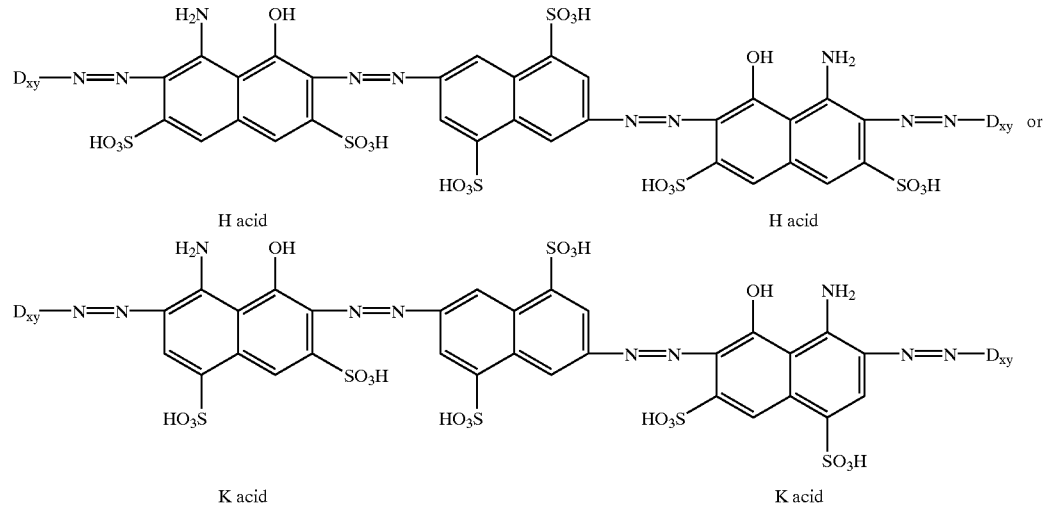

ksdepending on whether H or K acid is used as coupling component in the first coupling step, wherein $D_{xy}$ is as defined in Table 2. The dyes dye cellulose the shades indicated in Table 2 with good allround properties

TABLE 2

| Ex. H/K acid | $D_{xy}$ | shade |
|---|---|---|
| 16/17 $D_{11} =$ | ![structure: m-tolyl-SO2-CH2-CH2-OSO3H] | green |

TABLE 2-continued

| Ex. H/K acid | $D_{xy}$ | | shade |
|---|---|---|---|
| 18/19 | $D_{12}=$ | 2-methyl-5-(2-sulfatoethylsulfonyl)-benzenesulfonic acid (HO$_3$S, CH$_3$, SO$_2$—CH$_2$—CH$_2$—OSO$_3$H) | green |
| 20/21 | $D_{13}=$ | 3-(2,3-dibromopropionylamino)-6-methylbenzenesulfonic acid (HO$_3$S, CH$_3$, HN—C(O)—CH(Br)—CH$_2$Br) | green |
| 22/23 | $D_{14}=$ | 4-(2,3-dibromopropionylamino)-2-methylbenzenesulfonic acid (HO$_3$S, CH$_3$, HN—C(O)—CH(Br)—CH$_2$Br) | green |
| 24/25 | $D_{15}=$ | 4-methyl-CONH—(CH$_2$)$_2$—SO$_2$—(CH$_2$)$_2$—Cl | green |
| 26/27 | $D_{16}=$ | HO$_3$S, CH$_3$, CONH—(CH$_2$)$_2$—SO$_2$—(CH$_2$)$_2$—Cl | green |
| 28/29 | $D_{17}=$ | 4-methyl-CONH—(CH$_2$)$_2$—SO$_2$—(CH$_2$)$_2$—OSO$_3$H | green |
| 30/31 | $D_{18}=$ | 3-methyl-CONH—(CH$_2$)$_2$—SO$_2$—(CH$_2$)$_2$—OSO$_3$H | green |
| 32/33 | $D_{19}=$ | OCH$_3$, CH$_3$, SO$_2$—CH$_2$—CH$_2$—OSO$_3$H | green |
| 34/35 | $D_{20}=$ | OCH$_3$, CH$_3$, CH$_3$, SO$_2$—CH$_2$—CH$_2$—OSO$_3$H | green |
| 36/37 | $D_{21}=$ | OCH$_3$, OCH$_3$, SO$_2$—CH$_2$—CH$_2$—OSO$_3$H | green |

Preparation of a Mixture of the Compounds of Formulae (1b), (1b*) and (1b**)

By proceeding as described in Example 14 but using, instead of a solution of the diazotised amine according to Example 1, a solution containing a mixture, e.g. a 1:1 molar mixture, of the diazotised amines according to Example 1 and Example 2 in an equimolar amount, there is obtained a mixture of the compounds according to Examples 14 and 16 and a compound that in the form of the free acid corresponds to formula

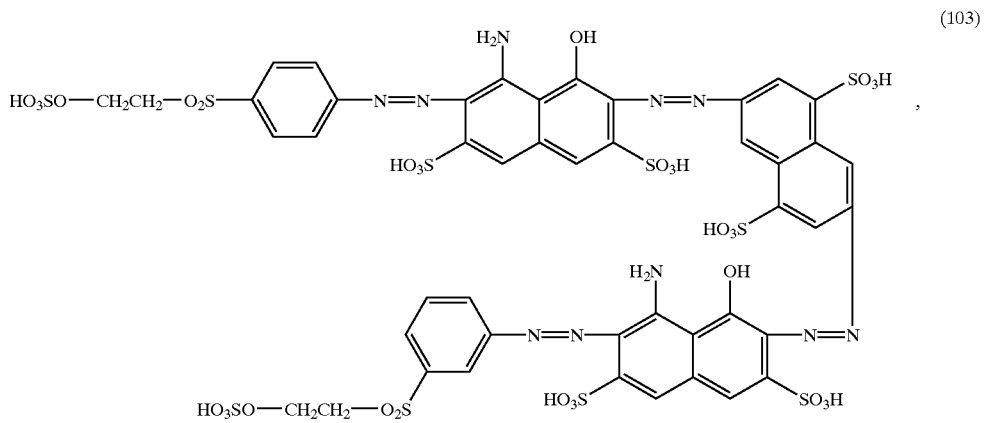
(103)

in the form of a dark powder that dyes cellulose a green shade having good allround properties.

The solution containing a mixture of the diazotised amines according to Example 1 and Example 2 can be prepared, for example, by proceeding as described in Example 1 but using, instead of an amine of formula $D_{10}$—$NH_2$, the equimolar amount of a mixture, e.g. a 1:1 molar mixture, of the amines of formulae $D_{10}$—$NH_2$ and $D_{11}$—$NH_2$, the radicals $D_{10}$ and $D_{11}$ being as defined in Table 1.

Further dye mixtures that dye cellulose shades of green having good allround properties can be prepared analogously to the procedure described above by using, instead of a mixture of the amines of formulae $D_{10}$—$NH_2$ and $D_{11}$—$NH_2$, for example, a mixture of the amines of formulae $D_{10}$—$NH_2$ and $D_{19}$—$NH_2$ or $D_{10}$—$NH_2$ and $D20$—$NH_2$ or $D_{10}$—$NH_2$ and $D_{21}$—$NH_2$ the radicals $D_{10}$, $D_{19}$, $D20$ and $D_{21}$ being as defined in Table 1.

Preparation of Compounds of Formula (1c)

EXAMPLE 38/39

The solution of tetraazo compound obtained according to Example 13 is added dropwise, at from 0 to 5° C., to a suspension of 32 parts of 1-amino-8-hydroxynaphthalene-3,6-disulfonic acid (H acid) or 32 parts of 1-amino-8-hydroxynaphthalene-4,6-disulfonic acid disulfonic acid (K acid) in 100 parts of water. The mixture is then allowed to warm up to room temperature and stirred until coupling is complete. The reaction mixture is then cooled to from 5 to 10° C., the pH value is raised to from 3 to 4 with sodium hydrogen carbonate and the solution, obtained according to Example 1, of the diazo compound of the amine of formula $D_{10}$—$NH_2$ is slowly added dropwise, the pH value being maintained at about from 3 to 4 during the dropwise addition by the addition of sodium hydrogen carbonate. Once coupling is complete, the dye solution is freed of salt by dialysis and concentrated by evaporation in vacuo to obtain the compound that in the form of the free acid corresponds to the formula

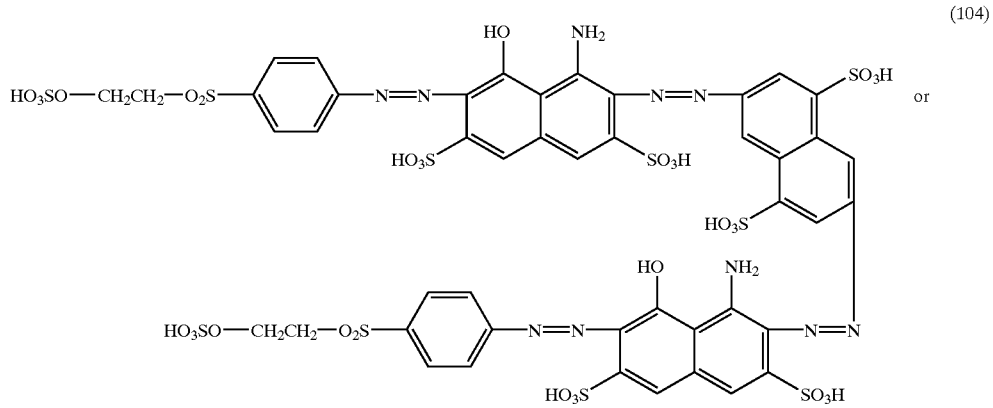
(104)

or

-continued

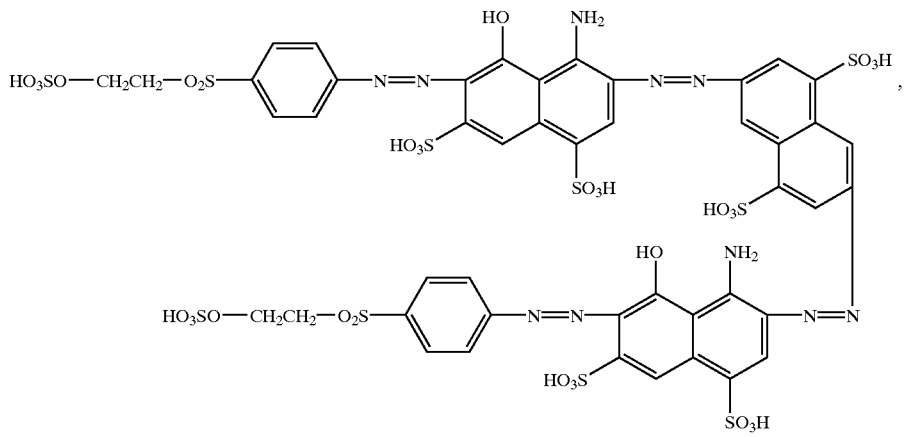
(105)

in the form of a dark powder that dyes cellulose a green shade having good allround properties.

EXAMPLES 40 TO 61

Analogously to the procedure described in Example 38 or 39, there can be prepared from the diazo compounds described in Examples 2 to 12 the dyes of the following general formula depending upon whether H or K acid is used as coupling component in the first coupling step, wherein $D_{xy}$ is as defined in Table 3. The dyes dye cellulose the shades indicated in Table 3 with good allround properties.

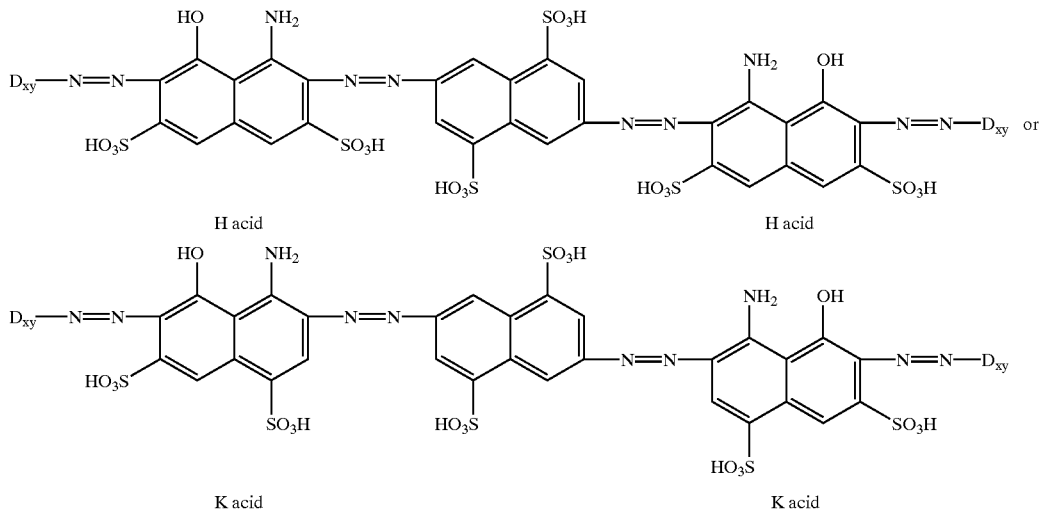

TABLE 3

| Ex. H/K acid | $D_{xy}$ | shade |
|---|---|---|
| 40/41 | $D_{11}$ = ![structure with SO2—CH2—CH2—OSO3H on methylbenzene] | green |
| 42/43 | $D_{12}$ = ![structure with HO3S and SO2—CH2—CH2—OSO3H on benzene] | green |

TABLE 3-continued

| Ex. H/K acid | | $D_{xy}$ | shade |
|---|---|---|---|
| 44/45 | $D_{13}$ = | 2-methyl-5-(2,3-dibromopropanoylamino)benzenesulfonic acid group: HO₃S on benzene, CH₃, HN—C(O)—CH(Br)—CH₂Br | green |
| 46/47 | $D_{14}$ = | 4-sulfo-3-methyl-phenyl with HN—C(O)—CH(Br)—CH₂Br substituent | green |
| 48/49 | $D_{15}$ = | —C₆H₄—CONH—(CH₂)₂—SO₂—(CH₂)₂—Cl | green |
| 50/51 | $D_{16}$ = | HO₃S-substituted methylphenyl—CONH—(CH₂)₂—SO₂—(CH₂)₂—Cl | green |
| 52/53 | $D_{17}$ = | —C₆H₄—CONH—(CH₂)₂—SO₂—(CH₂)₂—OSO₃H | green |
| 54/55 | $D_{18}$ = | meta-methylphenyl—CONH—(CH₂)₂—SO₂—(CH₂)₂—OSO₃H | green |
| 56/57 | $D_{19}$ = | 4-methoxy-3-methylphenyl—SO₂—CH₂—CH₂—OSO₃H | green |
| 58/59 | $D_{20}$ = | 2-methoxy-4-methyl-5-methylphenyl—SO₂—CH₂—CH₂—OSO₃H | green |
| 60/61 | $D_{21}$ = | 2,5-dimethoxy-4-methylphenyl—SO₂—CH₂—CH₂—OSO₃H | green |

Preparation of Further Diazotised Amines of Formula (10a) and (10b)

EXAMPLE 62

35 parts of the amine of formula $D_{22}$—$NH_2$, wherein $D_{22}$ is the radical of formula

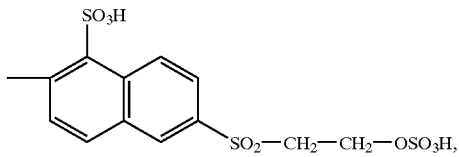

are added to 200 parts of water and stirred thoroughly. 16 parts of concentrated hydrochloric acid are added to the resulting suspension, the mixture is cooled to from 0 to 5° C. and 7 parts of sodium nitrite dissolved in 25 parts of water are slowly added dropwise. When the conversion of the amine to the corresponding diazo compound is complete, the excess of nitrite is destroyed by the addition of sulfamic acid.

EXAMPLES 63 TO 65

The diazo compounds of the amines given in Table 4 can be prepared analogously to the procedure described in Example 62 using, instead of 35 parts of the amine of formula $D_{22}$—$NH_2$, an equimolar amount of the amines $D_{xy}$—$NH_2$ given in Table 4.

TABLE 4

| Ex. | Amine $D_{xy}$-$NH_2$ | | $D_{xy}$ |
|---|---|---|---|
| 63 | $D_{23}$-$NH_2$ | $D_{23}$ = | (naphthalene with SO$_3$H at position 1, CH$_3$ at position 7, and SO$_2$—CH$_2$—CH$_2$—OSO$_3$H at position 5) |
| 64 | $D_{24}$-$NH_2$ | $D_{24}$ = | (naphthalene with CH$_3$ at position 7 and SO$_2$—CH$_2$—CH$_2$—OSO$_3$H at position 1) |
| 65 | $D_{25}$-$NH_2$ | $D_{25}$ = | (naphthalene with CH$_3$ at position 7, SO$_2$—CH$_2$—CH$_2$—OSO$_3$H at position 4, and SO$_3$H at position 2) |

Preparation of Further Compounds of Formula (1b)

EXAMPLE 66/67

The solution, obtained according to Example 62, of the diazo compound of the amine of formula D22—$NH_2$ is added dropwise, at from 0 to 5° C., to a suspension of 32 parts of 1-amino-8-hydroxynaphthalene-3,6-disulfonic acid (H acid) or 32 parts of 1-amino-8-hydroxynaphthalene-4,6-disulfonic acid (K acid) in 100 parts of water. The mixture is then allowed to warm up to room temperature and stirred until coupling is complete. The reaction mixture is then cooled to from 5 to 10° C., the pH value is raised to approximately 4.5 with sodium hydrogen carbonate and the solution of tetraazo compound obtained according to Example 13 is slowly added dropwise, the pH value being maintained at approximately 6.5 during the dropwise addition by the addition of sodium hydrogen carbonate. When coupling is complete, the dye solution is freed of salt by dialysis and concentrated by evaporation in vacuo to obtain the compound that in the form of the free acid corresponds to the formula

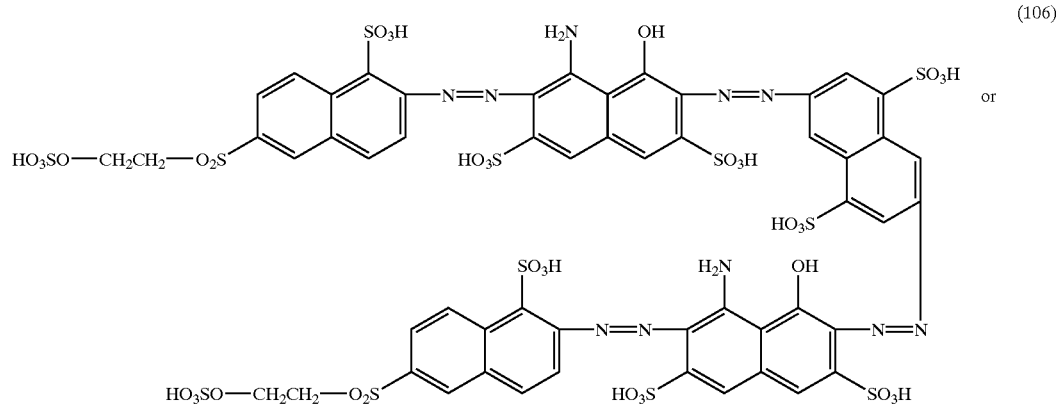

(106)

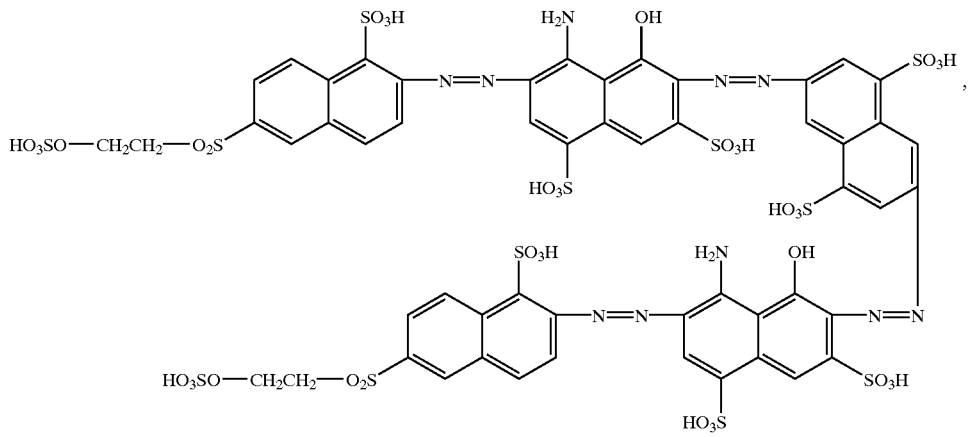

(107)

in the form of a dark powder that dyes cellulose a green shade having good allround properties.

EXAMPLES 68 TO 73

Analogously to the procedure described in Example 66 or 67 there can be prepared from the diazo compounds described in Examples 63 to 65 the dyes of the following general formula

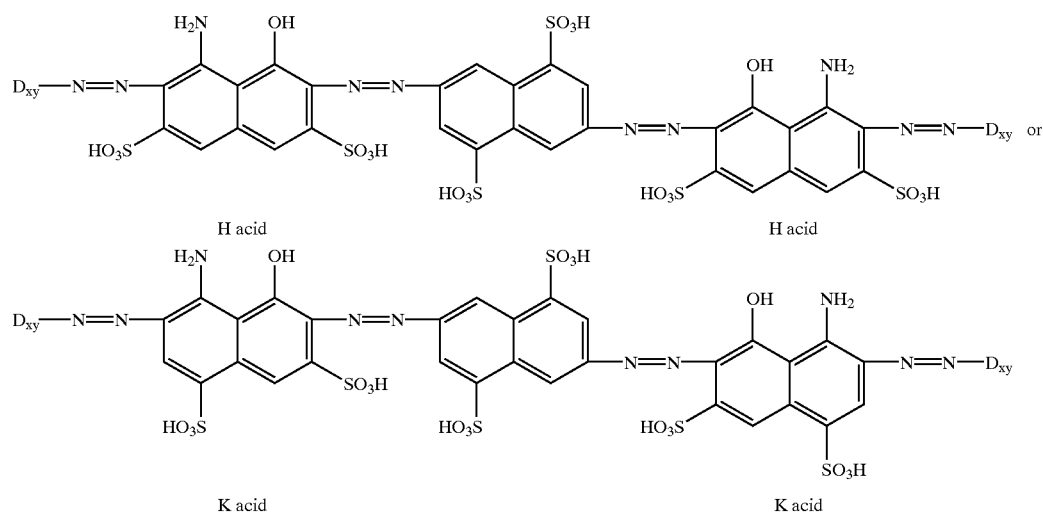

depending upon whether H or K acid is used as coupling component in the first coupling step, wherein $D_{xy}$ is as defined in Table 5. The dyes dye cellulose the shades indicated in Table 5 with good allround properties.

TABLE 5

| Ex. H/K acid | $D_{xy}$ | shade |
|---|---|---|
| 68/69 | $D_{23}$ = [naphthalene with CH₃ and SO₃H substituents, and SO₂—CH₂—CH₂—OSO₃H] | green |

TABLE 5-continued

| Ex. H/K acid | $D_{xy}$ | | shade |
|---|---|---|---|
| 70/71 | $D_{24} =$ | ![naphthalene with SO2-CH2-CH2-OSO3H] | green |
| 72/73 | $D_{25} =$ | ![naphthalene with SO2-CH2-CH2-OSO3H and SO3H] | green |

Preparation of Further Compounds of Formula (1c)

EXAMPLE 74/75

The solution of tetraazo compound obtained according to Example 13 is added dropwise, at from 0 to 5° C., to a suspension of 32 parts of 1-amino-8-hydroxynaphthalene-3,6-disulfonic acid (H acid) or 32 parts of 1-amino-8-hydroxynaphthalene-4,6-disulfonic acid (K acid) in 100 parts of water. The mixture is then allowed to warm up to room temperature and stirred until coupling is complete. The reaction mixture is then cooled to from 5 to 10° C., the pH value is raised to from 3 to 4 with sodium hydrogen carbonate and the solution, obtained according to Example 62, of the diazo compound of the amine of formula $D_{22}$—$NH_2$ is slowly added dropwise, the pH value being maintained at about from 3 to 4 during the dropwise addition by the addition of sodium hydrogen carbonate. When coupling is complete, the dye solution is freed of salt by dialysis and concentrated by evaporation in vacuo to obtain the compound that in the form of the free acid corresponds to the formula

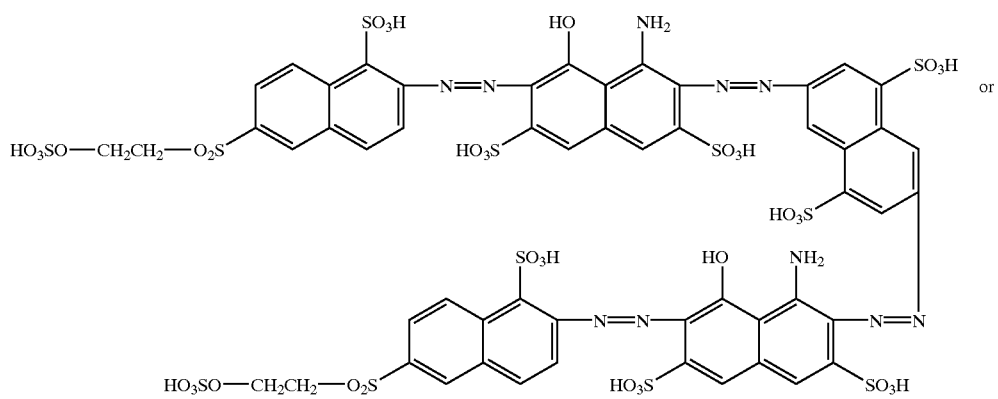

(108) or

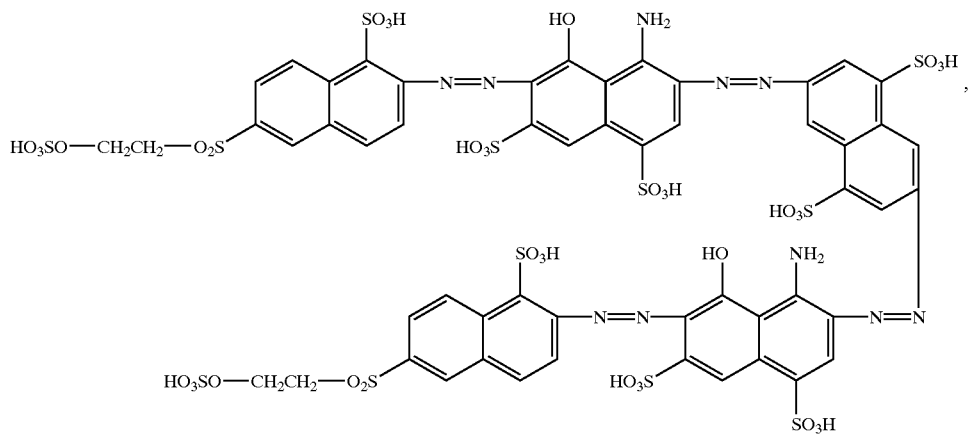

(109)

in the form of a dark powder that dyes cellulose a green shade having good allround properties.

EXAMPLES 76 TO 81

Analogously to the procedure described in Example 74 or 75 there can be prepared from the diazo compounds described in Examples 63 to 65 the dyes of the following general formula

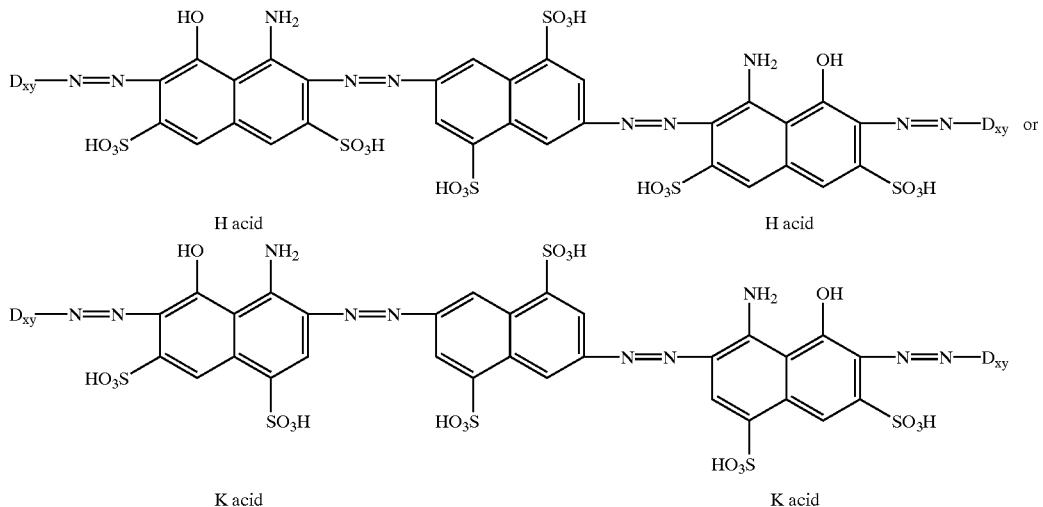

depending upon whether H or K acid is used as coupling component in the first coupling step, wherein $D_{xy}$ is as defined in Table 6. The dyes dye cellulose the shades indicated in Table 6 with good allround properties.

TABLE 6

| Ex. H/K acid | $D_{xy}$ | shade |
|---|---|---|
| 76/77 | $D_{23}$ = (7-methylnaphthalene with $SO_3H$ and $SO_2$—$CH_2$—$CH_2$—$OSO_3H$) | green |
| 78/79 | $D_{24}$ = (7-methylnaphthalene with $SO_2$—$CH_2$—$CH_2$—$OSO_3H$) | green |
| 80/81 | $D_{25}$ = (7-methylnaphthalene with $SO_2$—$CH_2$—$CH_2$—$OSO_3H$ and $SO_3H$) | green |

EXAMPLE 82

Analogously to the procedure described in Example 14, the dye that in the form of the free acid corresponds to formula (110)

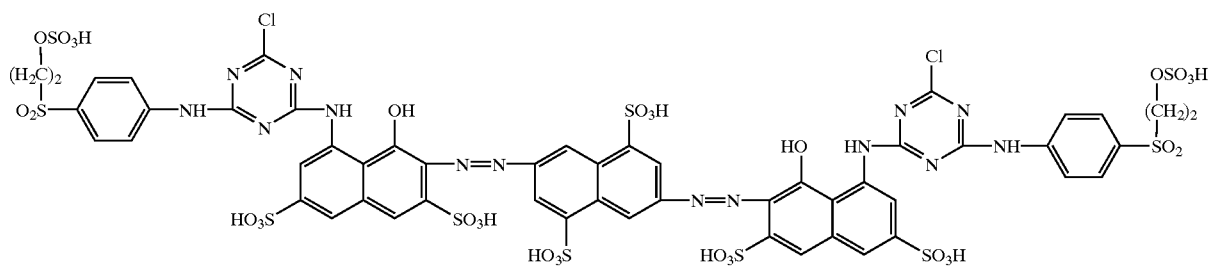

(110)

is obtained when as coupling component, instead of the azo compound prepared from H acid and the amine of formula $D_{10}$—$NH_2$, there is used an equimolar amount of the compound of the following formula

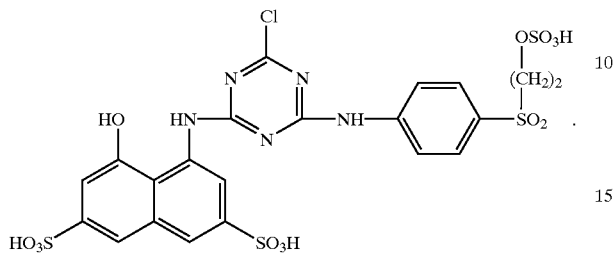

The dye of formula (110) dyes cellulose with good allround properties.

EXAMPLE 83

Analogously to the procedure described in Example 14, the dye that in the form of the free acid corresponds to formula (111)

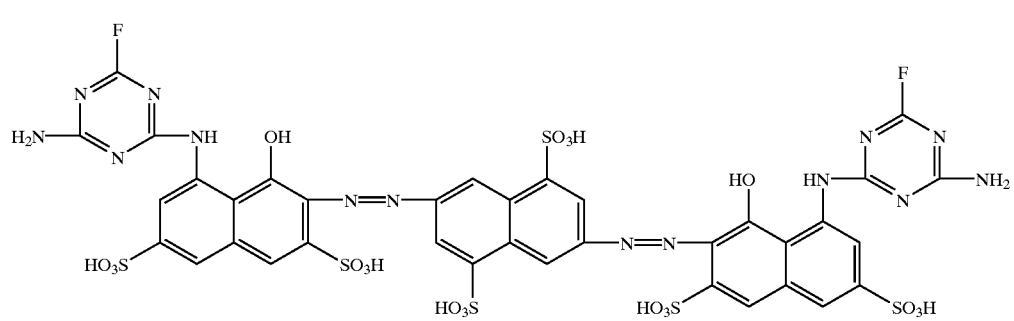

(111)

is obtained when as coupling component, instead of the azo compound prepared from H acid and the amine of formula $D_{10}$—$NH_2$, there is used an equimolar amount of the compound of the following formula

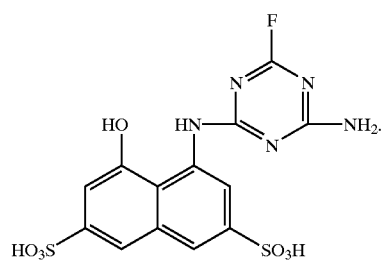

The dye of formula (111) dyes cellulose with good allround properties.

Preparation of Dye Mixtures of Formulae (12a) to (12d)

EXAMPLE 84

The solution, obtained according to Example 1, of the diazo compound of the amine of formula $D_{10}$—$NH_2$ is added dropwise, at from 0 to 5° C., to a suspension of (32—n) parts of 1-amino-8-hydroxynaphthalene-3,6-disulfonic acid (H acid) and n parts of 1-amino-8-hydroxynaphthalene-4,6-disulfonic acid (K acid) (n=1–31) in 100 parts of water. The mixture is allowed to warm up to room temperature and stirred until coupling is complete. The reaction mixture is then cooled to from 5 to 10° C., the pH value is raised to approximately 4.5 with sodium hydrogen carbonate and the solution of tetraazo compound obtained according to Example 13 is slowly added dropwise thereto, the pH value being maintained at approximately 6.5 during the dropwise addition by the addition of sodium hydrogen carbonate. When coupling is complete, the dye solution is freed of salt by dialysis and concentrated by evaporation in vacuo to obtain a mixture of the compounds that in the form of the free acid correspond to the formulae

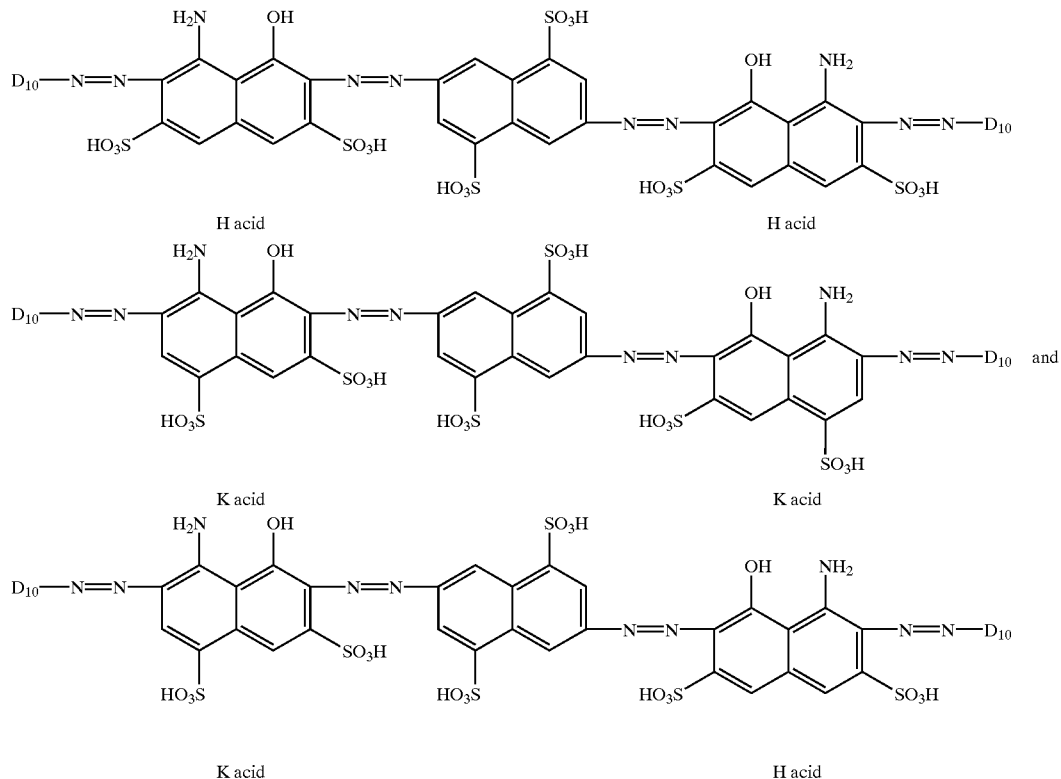

and dye cellulose a green shade having good allround properties.

Dyeing procedure I: 2 parts of the dye obtained according to Example 14 are dissolved in 400 parts of water; 1500 parts of a solution containing 53 g of sodium chloride per litre are added thereto. 100 parts of cotton fabric are placed in the dye bath at 40° C. After 45 minutes, 100 parts of a solution containing 16 g of sodium hydroxide and 20 g of calcined soda per litre are added. The temperature of the dye bath is maintained at 40° C. for a further 45 minutes. The dyed goods are then rinsed, soaped at the boil for a quarter of an hour with a non-ionic detergent, rinsed again and dried.

Dyeing procedure II: 2 parts of the reactive dye obtained according to Example 14 are dissolved in 400 parts of water; 1500 parts of a solution containing 53 g of sodium chloride per litre are added thereto. 100 parts of cotton fabric are placed in the dye bath at 35° C. After 20 minutes, 100 parts of a solution containing 16 g of sodium hydroxide and 20 g of calcined soda per litre are added. The temperature of the dye bath is maintained at 35° C. for a further 15 minutes. The temperature is then increased to 60° C. over a period of 20 minutes. The temperature is then maintained at 60° C. for a further 35 minutes. Rinsing is then carried out, followed by soaping at the boil for a quarter of an hour with a non-ionic detergent, rinsing again and drying.

Dyeing procedure III: 8 parts of the reactive dye obtained according to Example 14 are dissolved in 400 parts of water; 1400 parts of a solution containing 100 g of sodium sulfate per litre are added thereto. 100 parts of a cotton fabric are then placed in the dye bath at 25° C. After 10 minutes, 200 parts of a solution containing 150 g of trisodium phosphate per litre are added. The temperature of the dye bath is then raised to 60° C. over a period of 10 minutes. The temperature is maintained at 60° C. for a further 90 minutes. Rinsing is then carried out, followed by soaping at the boil for a quarter of an hour with a non-ionic detergent, rinsing again and drying.

Dyeing procedure IV: 4 parts of the reactive dye obtained according to Example 14 are dissolved in 50 parts of water. 50 parts of a solution containing 5 g of sodium hydroxide and 20 g of calcined soda per litre are added thereto. A cotton fabric is then pad-dyed with the resulting solution to a weight gain of 70%, and is then wound onto a roll. The cotton fabric is stored in that form for 3 hours at room temperature. The dyed goods are then rinsed, soaped at the boil for a quarter of an hour with a non-ionic detergent, rinsed again and dried.

Dyeing procedure V: 6 parts of the reactive dye obtained according to Example 14 are dissolved in 50 parts of water. 50 parts of a solution containing 16 g of sodium hydroxide and 0.04 litre of water glass (38°bé) per litre are added thereto. A cotton fabric is pad-dyed with the resulting solution to a weight gain of 70%, and is then wound onto a roll. The cotton fabric is stored in that form for 10 hours at room temperature. The dyed goods are then rinsed, soaped at the boil for a quarter of an hour with a non-ionic detergent, rinsed again and dried.

Dyeing procedure VI: 2 parts of the reactive dye obtained according to Example 14 are dissolved in 100 parts of water with the addition of 0.5 part of sodium m-nitrobenzene-sulfonate. A cotton fabric is impregnated with the resulting solution to a weight gain of 75%, and is then dried. The fabric is then impregnated with a solution at 20° C. containing 4 g of sodium hydroxide and 300 g of sodium chloride per litre, squeezed off to a 75% weight gain, and the dyeing is steamed for 30 seconds at from 100 to 102° C., rinsed, soaped for a quarter of an hour in a 0.3% boiling solution of a non-ionic detergent, rinsed and dried.

Printing procedure I: While stirring rapidly, 3 parts of the reactive dye obtained according to Example 14 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed fabric is steamed in saturated steam at 102° C. for 2 minutes. The printed fabric is then rinsed, optionally soaped at the boil and rinsed again, and then dried.

Printing procedure II: While stirring rapidly, 5 parts of the reactive dye obtained according to Example 14 are sprinkled into 100 parts of a stock thickener containing 50 parts of 5% sodium alginate thickener, 36.5 parts of water, 10 parts of urea, 1 part of sodium m-nitrobenzenesulfonate and 2.5 parts of sodium hydrogen carbonate. The print paste so obtained, the stability of which meets technical requirements, is used to print a cotton fabric; drying is carried out and the resulting printed fabric is steamed in saturated steam at 102° C. for 8 minutes. The printed fabric is then rinsed, optionally soaped at the boil and rinsed again, and then dried.

What is claimed is:

1. A compound of formula (1)

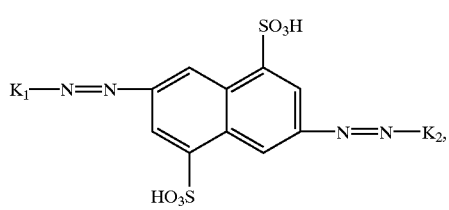

(1)

wherein
- $K_1$ and $K_2$ are each independently of the other the radical of a coupling component from the benzene series, naphthalene series, 4-alkyl-6-hydroxypyridone-(2) series, 2,5-diamino-4-alkylpyridine series, 1-arylpyrazolone-(5) series or 1-aryl-5-aminopyrazole series, at least one of the radicals $K_1$ and $K_2$ containing a fibre-reactive group,
- with the proviso that
  - (i) the fibre-reactive group is not 2-(β-sulfatoethylsulfonyl)ethylamino when $K_1$ and $K_2$ are phenyl substituted by a fibre-reactive group, and
  - (ii) the fibre-reactive group is not β-sulfatoethylsulfonyl when $K_1$ and $K_2$ are N-(β-sulfato-ethyl)aniline substituted on the phenyl ring by a fibre-reactive group.

2. A compound according to claim 1, wherein each of the radicals $K_1$ and $K_2$ contains at least one fibre-reactive group.

3. A compound according to claim 1, wherein $K_1$ and $K_2$ each independently of the other denote one or more identical or different substituents from the group $C_1$–$C_{12}$alkyl, $C_1$–$C_8$alkoxy, $C_1$–$C_4$alkoxy substituted in the alkyl moiety by hydroxy, $C_1$–$C_4$-alkoxy or by sulfato, $C_2$–$C_8$alkanoylamino, amino, N-mono- or N,N-di-$C_1$–$C_4$-alkylamino unsubstituted or substituted in the alkyl moiety by hydroxy, sulfo, sulfato or by $C_1$—$C_4$alkoxy, phenylamino unsubstituted or substituted in the phenyl moiety by methyl, methoxy, halogen or by sulfo, N—$C_1$–$C_4$-alkyl-N-phenylamino unsubstituted or substituted in the alkyl moiety by hydroxy, sulfo or by sulfato or unsubstituted or substituted in the phenyl moiety by methyl, methoxy, halogen or by sulfo, unsubstituted or sulfo-substituted naphthylamino, $C_2$–$C_8$alkanoyl, benzoyl, $C_1$–$C_4$alkoxycarbonyl, $C_1$–$C_4$alkylsulfonyl, phenyl- or naphthylsulfonyl, trifluoromethyl, nitro, cyano, hydroxy, halogen, carbamoyl, N—$C_1$–$C_4$-alkylcarbamoyl, sulfamoyl, N—$C_1$–$C_4$alkylsulfamoyl, N-(β-hydroxyethyl)sulfamoyl, N,N-di-(β-hydroxyethyl)sulfamoyl, N-phenylsulfamoyl, ureido, carboxy, sulfomethyl, sulfo or sulfato and a fibre-reactive radical of formula (2a), (2b), (2c), (2d) or (2e)

—SO$_2$—Y (2a),

—CONR$_2$—(CH$_2$)$_n$—SO$_2$—Y (2b),

—NH—CO—CH(Hal)—CH$_2$—(Hal) (2c),

—NH—CO—C(Hal)=CH$_2$ (2d) or

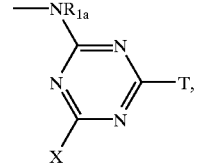

(2e)

wherein
- Hal is chlorine or bromine and
- X is halogen, 3-carboxypyridin-1-yl or 3-carbamoylpyridin-1-yl,
- T independently thereof has a meaning given for X or is hydroxy, $C_1$–$C_4$alkoxy, phenoxy, $C_1$–$C_4$alkylthio, morpholino, amino unsubstituted or substituted by non-fibre-reactive radicals, or a fibre-reactive radical of formula (3a), (3b), (3c), (3d), (3e) or (3f)

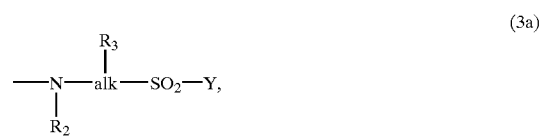

(3a)

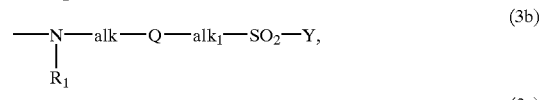

(3b)

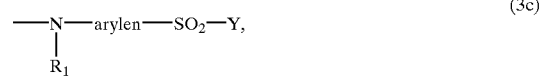

(3c)

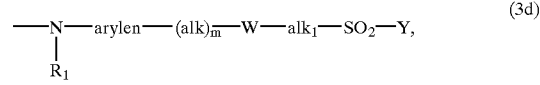

(3d)

(3e)

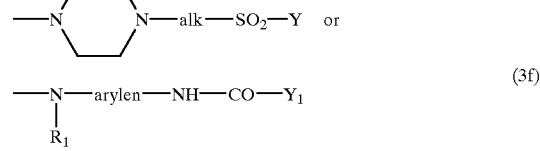

(3f)

$R_1$ and $R_{1a}$ are each independently of the other hydrogen or $C_1$–$C_4$alkyl, $R_2$ is hydrogen, $C_1$–$C_4$alkyl unsubstituted or substituted by hydroxy, sulfo, sulfato, carboxy or by cyano, or a radical

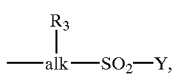

$R_3$ is hydrogen, hydroxy, sulfo, sulfato, carboxy, cyano, halogen, $C_1-C_4$alkoxycarbonyl, $C_1-C_4$alkanoyloxy, carbamoyl or the group —$SO_2$—Y, alk and alk, are each independently of the other $C_1-C_6$alkylene, arylene is a phenylene or naphthylene radical unsubstituted or substituted by sulfo, carboxy, $C_1-C_4$alkyl, $C_1-C_4$alkoxy or by halogen, $Y_1$ is a group —CH(Hal)—$CH_2$—Hal or —C(Hal)=$CH_2$ and Hal is chlorine or bromine, Q is a radical —O— or —$NR_1$—, wherein $R_1$ is as defined above, W is a group —$SO_2$—$NR_2$—, —$CONR_2$— or —$NR_2CO$—, n is an integer from 1 to 6 and m is 0 or 1 and Y is vinyl or a radical —$CH_2$—$CH_2$—U and U is a group removable under alkaline conditions.

4. A compound according to claim 1, wherein $K_1$ and $K_2$ are each independently of the other a radical of formula (4c'), (4c''), (4d'), (4e'), (4f'), (4g') (4h'), (4i'), (4j') or (4k')

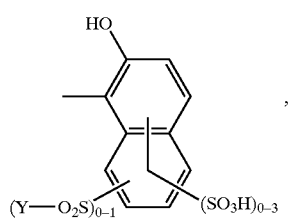
(4c')

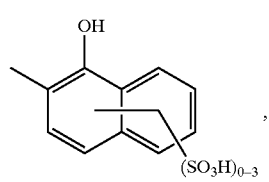
(4c'')

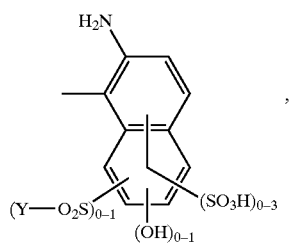
(4d')

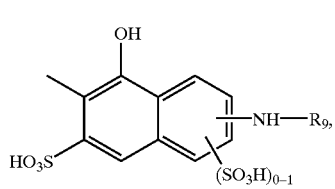
(4e')

-continued

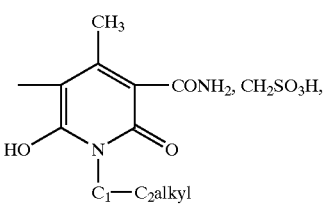
(4f')

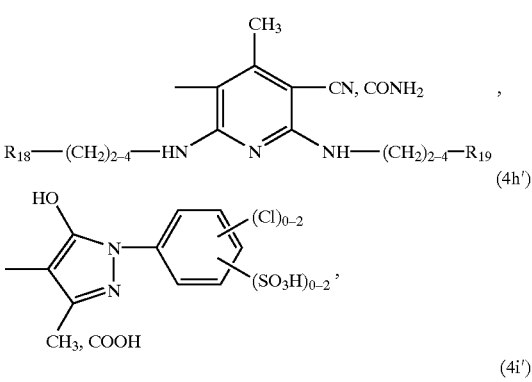
(4g')

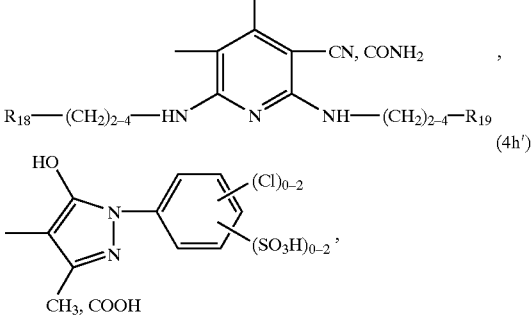
(4h')

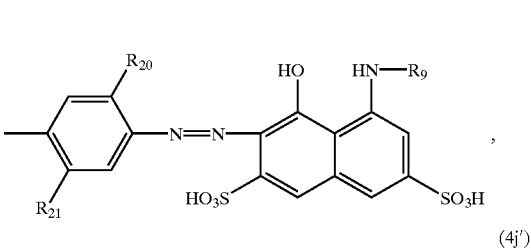
(4i')

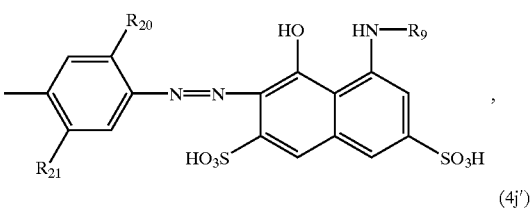
(4j')

or

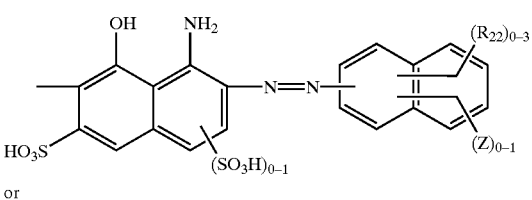
(4k')

wherein
$R_9$ is acetyl, benzoyl or a radical of formula (2e')

(2e')

wherein
X is halogen and
T is $C_1-C_4$alkoxy, $C_1-C_4$alkylthio, hydroxy, amino, N—$C_1-C_4$alkylamino unsubstituted or substituted in the alkyl moiety by hydroxy, sulfato or by sulfo, morpholino, phenylamino or N—$C_1$–$C_4$alkyl-N-phenylamino wherein the alkyl is unsubstituted or substituted by hydroxy, sulfo or by sulfato and the phenyl is in each case unsubstituted or substituted by sulfo, carboxy, acetylamino, methyl or by methoxy, or a fibre-reactive radical of formula (3c') or (3d')

(3c')

or

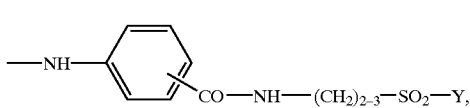
(3d')

$R_{18}$ is hydrogen, hydroxy or sulfato, $R_{19}$ independently thereof has a meaning given for $R_{18}$ or is a radical of formula (2c), $R_{20}$ and $R_{21}$ are each independently of the other hydrogen, methyl, methoxy, 2-hydroxy-ethoxy, 2-sulfatoethoxy, acetylamino, propionylamino, ureido or sulfo, $(R_{22})_{0-3}$ denotes from 0 to 3 identical or different radicals selected from the group sulfo, chlorine, $C_1$–$C_4$alkyl and $C_1$–$C_4$alkoxy, $(Z)_{0-1}$, where present, denotes a radical of formula (2a), (2b), (2c) or (2d) and Y is vinyl, β-bromo- or β-chloro-ethyl, β-acetoxyethyl, β-benzoyloxyethyl, β-phosphatoethyl, β-sulfatoethyl and β-thiosulfatoethyl.

5. A compound according to claim 4, wherein $K_1$ and $K_2$ are each independently of the other a radical of formula (4e'), (4j') or (4k').

6. A compound according to claim 1, wherein $K_1$ and $K_2$ are identical.

7. A compound according to claim 1, wherein the compounds of formula (1) are compounds of formula (1a)

$D_2$ is a radical of formula (6b)

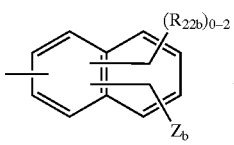
(6b)

$(R_{22a})_{0-2}$ and $(R_{22b})_{0-2}$ each independently of the other denote from 0 to 2 identical or different substituents selected from the group sulfo, chlorine, $C_1$–$C_4$alkyl and $C_1$–$C_4$alkoxy, of the radicals $G_1$ and $G_2$ one is hydroxy and the other is amino, of the radicals $G_3$ and $G_4$ one is hydroxy and the other is amino, p, q, r and s are each independently of the others 0 or 1, the sum of p and q being the number 1 or 2, the sum of r and s being the number 1 or 2, and $Z_a$ and $Z_b$ are each independently of the other a radical of formula (2a), (2b), (2c) or (2d)

—$SO_2$—Y (2a),

—$CONR_2$—$(CH_2)_n$—$SO_2$—Y (2b),

—NH—CO—CH(Hal)—$CH_2$—Hal (2c) or

—NH—CO—C(Hal)=$CH_2$ (2d)

wherein n is the number 2, 3 or 4,

Hal is chlorine or bromine and

Y is vinyl or a radical —$CH_2$—$CH_2$—U and U is a group removable under alkaline conditions.

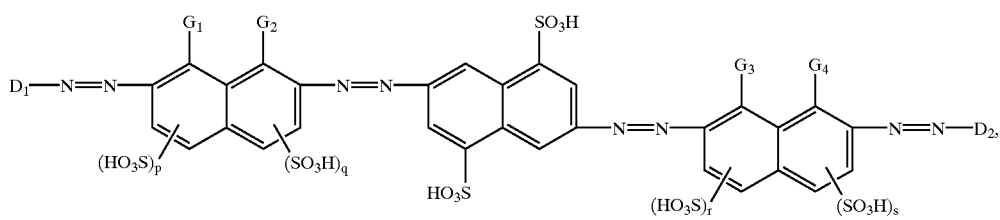
(1a)

wherein $D_1$ is a radical of formula (6a)

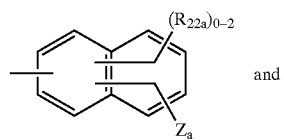
(6a)

and

8. A compound according to claim 7, wherein the sum of p and q is the number 2 and the sum of r and s is the number 2.

9. A compound according to claim 7, wherein the compounds of formula (1a) are compounds of formula (1b) or (1c)

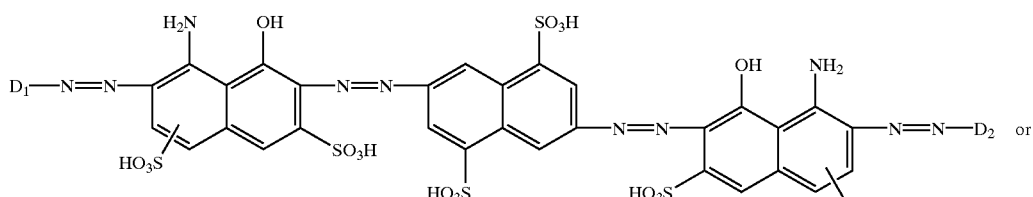

(1b)

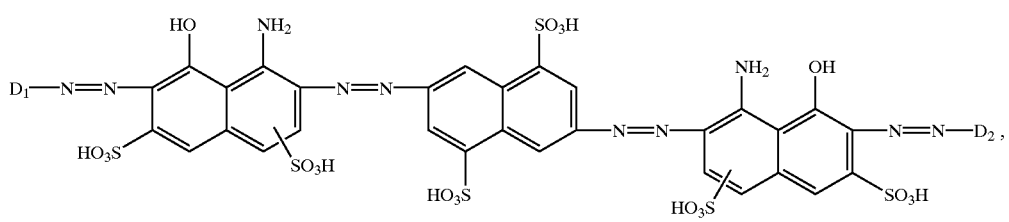

(1c)

wherein $D_1$ and $D_2$ are each independently of the other a radical of formula (6c), (6d), (6e) or (6f)

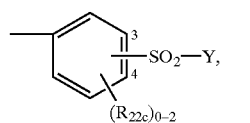 (6c)

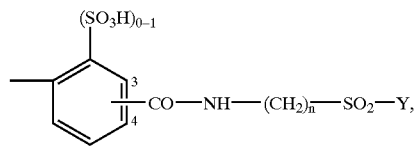 (6d)

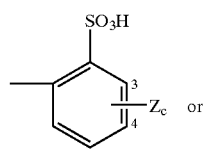 (6e)

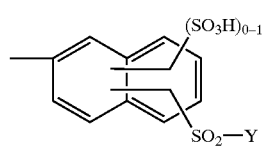 (6f)

wherein $(R_{22c})_{0-2}$ denotes from 0 to 2 identical or different substituents selected from the group sulfo, methyl and methoxy, $Z_c$ is α,β-dibromopropionylamino or α-bromoacryloylamino, n is the number 2, 3 or 4 and Y is vinyl, β-chloroethyl or β-sulfatoethyl.

10. A compound according to claim 9, wherein $D_1$ and $D_2$ are radicals of formula (6c), wherein $(R_{22c})_{0-2}$ denotes from 0 to 2 identical or different substituents selected from the group methyl and methoxy and Y is vinyl or β-sulfatoethyl.

11. A process for the preparation of a compound of formula (1) according to claim 1, wherein approximately 1 molar equivalent of the compound of formula

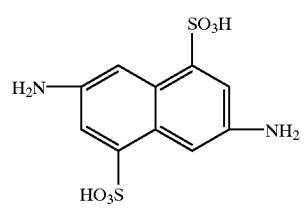 (7)

is tetraazotised with a nitrite in an acid medium, and the tetraazotised compound is coupled with approximately 1 molar equivalent of a coupling component of formula $K_1$—H  (8) and with approximately 1 molar equivalent of a coupling component of formula $K_2$—H  (9)

wherein the definitions given in claim 1 for each of $K_1$ and $K_2$ apply.

12. A dye mixture comprising two or more compounds of formula (1) according to claim 1.

13. A dye mixture according to claim 12 comprising at least one compound of formulae (12a) and (12b)

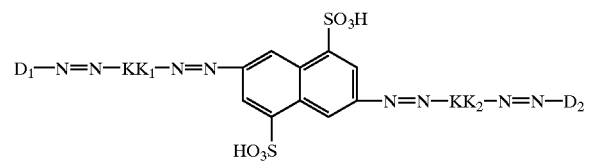

(12a)

and

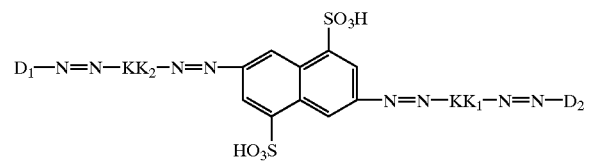

(12b)

together with at least one compound of formulae (12c) and (12d)

(12c)

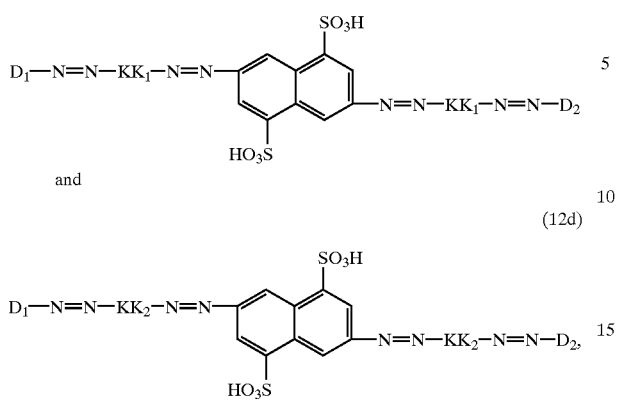

and (12d)

(6e)

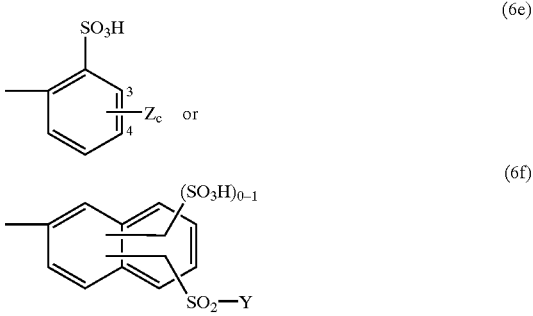

wherein

D₁ and D₂ are each independently of the other a radical of formula (6c), (6d), (6e) or (6f)

(6c)

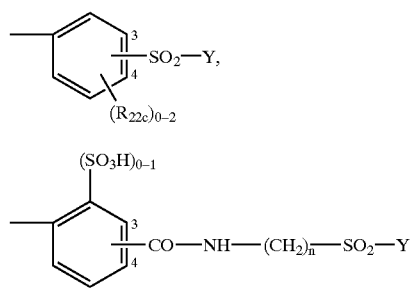

(6d)

wherein $(R_{22c})_{0-2}$ denotes from 0 to 2 identical or different substituents selected from the group sulfo, methyl and methoxy, $Z_c$ is α,β-dibromopropionylamino or α-bromoacryloylamino, n is the number 2, 3 or 4 and Y is vinyl, β-chloroethyl or β-sulfatoethyl, $KK_1$ is the radical of 1-amino-8-hydroxynaphthalene-3,6-disulfonic acid (H acid) and $KK_2$ is the radical of 1-amino-8-hydroxynaphthalene-4,6-disulfonic acid (K acid).

14. A process for dyeing or printing fibre materials containing hydroxyl groups or nitrogen, which comprises applying to said fibre material a fibre-reactive dye of formula (1) according to claim 1.

15. A process according to claim 14, wherein said fibre material is cellulosic fibre material.

* * * * *